United States Patent [19]
Pignatello

[11] Patent Number: 5,232,484
[45] Date of Patent: Aug. 3, 1993

[54] DEGRADATION OF PESTICIDES BY FERRIC REAGENTS AND PEROXIDE IN THE PRESENCE OF LIGHT

[75] Inventor: Joseph J. Pignatello, Hamden, Conn.

[73] Assignee: The Connecticut Agricultural Experiment Station, New Haven, Conn.

[21] Appl. No.: 744,365

[22] Filed: Aug. 13, 1991

[51] Int. Cl.$^5$ .................... A01N 37/38; A01N 43/70; C02F 1/72
[52] U.S. Cl. .................... 588/206; 210/759; 588/207; 588/210
[58] Field of Search .................... 71/117, 116, 93; 210/749, 758, 759

[56] References Cited

U.S. PATENT DOCUMENTS

| | | | |
|---|---|---|---|
| 3,819,516 | 6/1974 | Murchison et al. | 422/24 |
| 4,569,769 | 2/1986 | Walton et al. | |
| 4,585,753 | 4/1986 | Scott et al. | |

OTHER PUBLICATIONS

Skurlatov, Y. I. J. Agric. Food Chem. 31: 1065–1071, 1983.
Larson, R. A. "Sensitized Photodecomposition of Organic Compounds Found in Illinois Wastewaters", HWRIC-RR-045, May 1990.
Bailin, L. J., et al., 12 Environ. Sci. Technol. 673–679 (1978).
Barbeni, M., et al., 16 Chemosphere 2225–2237 (1987) at 2229 and Figure 4 on 2232.
Ehart, O. R. 1985 National Workshop on Pesticide Waste Disposal Proceedings EPA/600/9-85/030, pp. 2 to 11.
Eul, W., et al., "Hydrogen Peroxide-Based Treatment Technology for Hazardous Waste," Emerging Technologies In Hazardous Waste Management, ACS Symposium No. 422, 1990, 1–35 at 29.
Ferguson, T. L., and Wilkinson, R. R. in Krueger, R. F., and Seiber, J. N. eds, Treatment and Disposal of Pesticide Wastes, ACS, 1984, Chapter 11, pp. 181 to 191.
Honeycutt, R. C., 1985 National Workshop on Pesticide Waste Disposal Proceedings EPA/600/9-85/030, pp. 72 to 85.
Johnson, L. J., and Talbot, H. W., 39 Experimentia 1236–1246 (1983).
Mill, T., and Haag, W. R., Preprints of Extended Abstracts, 198th Nat. Meeting Amer. Chem. Soc. Div. Env. Chem., A.C.S., Washington, 1969, paper 155, pp. 342–345.
Munnecke, D. M., 70 Residue Rev. 1–26 (1979).
Murphy, A. P., et al., 23 Environ. Sci. Technol. 166–169 (1989).
Nye, J. C., 1985 National Workshop on Pesticide Waste Disposal Proceedings EPA/600/9-85/030 pp. 43 to 480.
Plimmer, J. R., et al., 19 J. Agr. Food Chem. 572–573 (1971).
Schmidt, C., 1986 National Workshop on Pesticide Waste Disposal Proceedings EPA/600/9-87/001, pp. 45 to 52.
Sedlak, D. L. and Andren, A. W., 25 Environ. Sci. Technol. 777–782 (1991).
Watts, R. J., et al., Extended Abstracts #156, 198th ACS Meeting, Env. Chem. Div., 1989, pp. 346–349.
Wei, T. Y., et al., J. Photochem. Photobiol. A: Chem., 55: 115–126 (1990).

Primary Examiner—Allen J. Robinson
Assistant Examiner—S. Mark Clardy
Attorney, Agent, or Firm—St. Onge Steward Johnston & Reens

[57] ABSTRACT

A method for mineralizing pesticides, notably aromatic pesticides, using ferric ion in an acid aqueous solution at room temperature is disclosed. In a preferred embodiment, the ferric ion is employed in the presence of hydrogen peroxide; degradation occurs in the light or in the dark, although light accelerates the degradation. The method also is functional in the absence of hydrogen peroxide, but light and oxygen is required in this method. Preferred degradation methods are conducted in the presence of hydrogen peroxide and light, and in the absence of large concentrations of organic solvents, chloride, and sulfate.

13 Claims, 11 Drawing Sheets

DEGRADATION OF PESTICIDES BY FERRIC REAGENTS AND PEROXIDE IN THE PRESENCE OF LIGHT

BACKGROUND OF THE INVENTION

This invention relates to the degradation of organic pesticides, notably aromatic compounds such as chlorinated aromatics, by ferric reagents to form inorganic wastes.

Chlorinated hydrocarbon, organophosphorus, organonitrogen, organometallic, and the like pesticide compounds number among the hazardous wastes that require special methods for disposal because of their toxic, refractory, or persistent properties. Many of these compounds that do not degrade pose a threat to biota and/or human populations. Concern about the potential hazards associated with the compounds has resulted in numerous recent laws and policies that require the cleanup of contaminated soil, sediments, surface water, and wastewater.

A number of disposal techniques have been suggested for various types of these toxic chemicals (see reviews by Munnecke, D. M., 70 *Residue Rev.* 1-26 (1979) and Ehart, O. R., 1985 *National Workshop on Pesticide Waste Disposal Proceedings* EPA/600/9-85/030, pages 2 to 11. Physical methods include entrapment, burial, adsorption, flocculation, and the like (reviewed by Nye, J. C., 1985 *National Workshop on Pesticide Waste Disposal Proceedings*, cited above, pages 43 to 480); an example is the activated charcoal detoxification of pesticides disclosed by Scott in U.S. Pat. No. 4,585,753. Chemical methods include oxidation, reduction, hydrolysis, conjugation, irradiation, and the like (reviewed by Honeycutt, R. C., 1985 *National Workshop on Pesticide Waste Disposal Proceedings*, cited above, pages 72 to 85); examples include incineration (discussed by Ferguson, T. L., and Wilkinson, R. R., in Krueger, R. F., and Seiber, J. N., eds., *Treatment and Disposal of Pesticide Wastes*, ACS, 1984, chapter 11, pages 181 to 191), thiosulfate oxidation using hydrogen peroxide and copper disclosed by Walton and Rutz in U.S. Pat. No. 4,569,769, and the microwave plasma detoxification process described in Bailin, L. J., et al., 12 *Environ. Sci. Technol.* 673-679 (1978). Biological methods include degradation by enzymes and microorganisms (Schmidt, C., 1986 *National Workshop on Pesticide Waste Disposal Proceedings*, EPA/600/9-87/001, pages 45 to 52, and Johnson, L. M., and Talbot, H. W., 39 *Experientia* 1236-1246 (1983)).

Waste treatment systems employing Fenton's reagent, i.e., hydrogen peroxide containing ferrous ions, have been suggested for the degradation of chlorobenzene, phenols, formaldehyde, s-triazine herbicides and octachloro-p-dibenzo-dioxin (Plimmer, J. R., et al., 19 *J. Agr. Food Chem.* 572-573 (1971), Watts, R. J., et al., *Extended Abstracts* #198th ACS Meeting, Env. Chem. Div., 1989, pages 346-349, and Sedlak, D. L., and Andren, A. W., 25 *Environ. Sci. Technol.* 777-782 (1991)). Treatment of hazardous wastes with Fenton's reagent "has its limitations. Non-polar organic molecules like polycyclic aromatics, benzene, mesitylene or hydrocarbons with long carbon chains are especially difficult to destroy" (Eul, W., et al., "Hydrogen Peroxide-Based Treatment Technology for Hazardous Waste," *Emerging Technologies in Hazardous Waste Management*, ACS Symposium No. 422, 1990, 1-35 at 29).

Iron hydroxide finely dispersed on inorganic supports that are unreactive to HO°, including silica and montmorillonite clay, have been disclosed to improve the efficiency of waste water treatments using $H_2O_2$ (Mill, T., and Haag, W. R., *Preprints of Extended Abstracts*, 198th Nat. Meeting Amer. Chem. Soc., Div. Env. Chem., A.C.S., Washington, 1969, paper 155, pp. 342-345). Phenol has been photocatalytically oxidized in the presence of hydrogen peroxide and titanium dioxide powders in the presence and absence of ferric ions (Wei, T. Y., et al., *J. Photochem. Photobiol. A: Chem.*, 55: 115-126 (1990). Dilute aqueous formaldehyde waste solutions have been neutralized by ferric chloride and hydrogen peroxide in a process developed for treating Bureau of Reclamation reverse osmosis desalting membrane storage solutions (Murphy, A. P., et al., 23 *Environ. Sci. Technol.* 166-169 (1989)). However, Barbeni, M., et al., found the addition of ferric ions instead of ferrous inconsequential in the chemical degradation of chlorophenols by Fenton's reagent (16 Chemosphere 2225-2237 (1987) at 2229 and FIG. 4 on 2232).

SUMMARY OF THE INVENTION

It is an object of the present invention to provide a new method for degrading pesticides. It is another object of the present invention to provide a method for decontaminating equipment. It is a further object of the present invention to provide a degradation method that employs environmentally benign and inexpensive reagents and equipment, and yields virtually complete mineralization of the pesticides.

These and other objects are achieved by the present invention, which describes methods of degrading pesticides of the type having a formula containing more than one carbon atom, notably aromatics, under mild conditions using ferric reagents. Preferred embodiments achieve substantial mineralization of the pesticides by contacting them in an oxygenated acidic aqueous solution with ferric ion in an amount and for a time effective to achieve substantial mineralization. Degradations conducted in the dark require an oxidizing agent such as a peroxide; hydrogen peroxide is preferred. In light, peroxide (or other oxidizing agent) is not required, but it greatly accelerates degradation. In one embodiment, pesticides are degraded in aqueous solutions having a pH of about 1.5 to about 3.5, preferably about 2.5 to about 3.0, by ferric ion in light for a time effective to achieve substantial mineralization. In another embodiment, pesticides are degraded in aqueous solutions having a pH of about 1.5 to about 3.5, preferably about 2.5 to about 3.0, by contacting the pesticide with a composition comprising ferric ion and peroxide in the presence or in the absence of light. Preferred methods are conducted in absence of large concentrations of organic solvents, chloride, and sulfate.

BRIEF DESCRIPTION OF THE FIGURES

FIG. 1 is the perchlorate solution 0.2M in sodium perchlorate and 2.5 mM in peroxide. FIG. 2 is the sulfate solution, is 10 mM in peroxide.

FIG. 4 plots the ferric-catalyzed decomposition of the hydrogen peroxide control described in Example 1. The initial reaction mixture contains 0.99 mM $Fe^{+3}$, 100 mM $H_2O_2$, and 0.2M $NaClO_4$. The $k_{obs}$ incorporates ferric ion and hydrogen ion concentration terms In FIG. 8, alpha is bright light and iron alone, beta is bright light and peroxide alone, and theta is dark with iron alone.

DETAILED DESCRIPTION OF THE INVENTION

Figure 1:
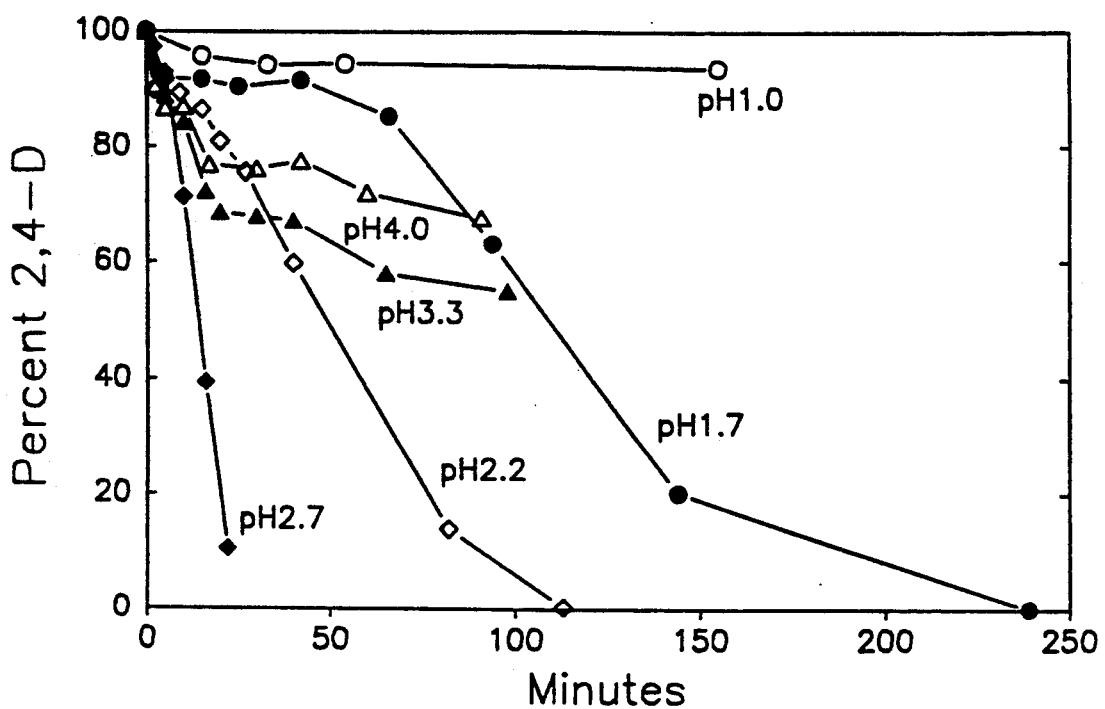
FIGS. 1 and 2 show the ferric reagent-catalyzed oxidation of 2,4-dichlorophenoxyacetic acid using the method described in Example 1. The herbicide concentration is 0.1 mM and the iron concentration is 1.0 mM.
Figure 1A:
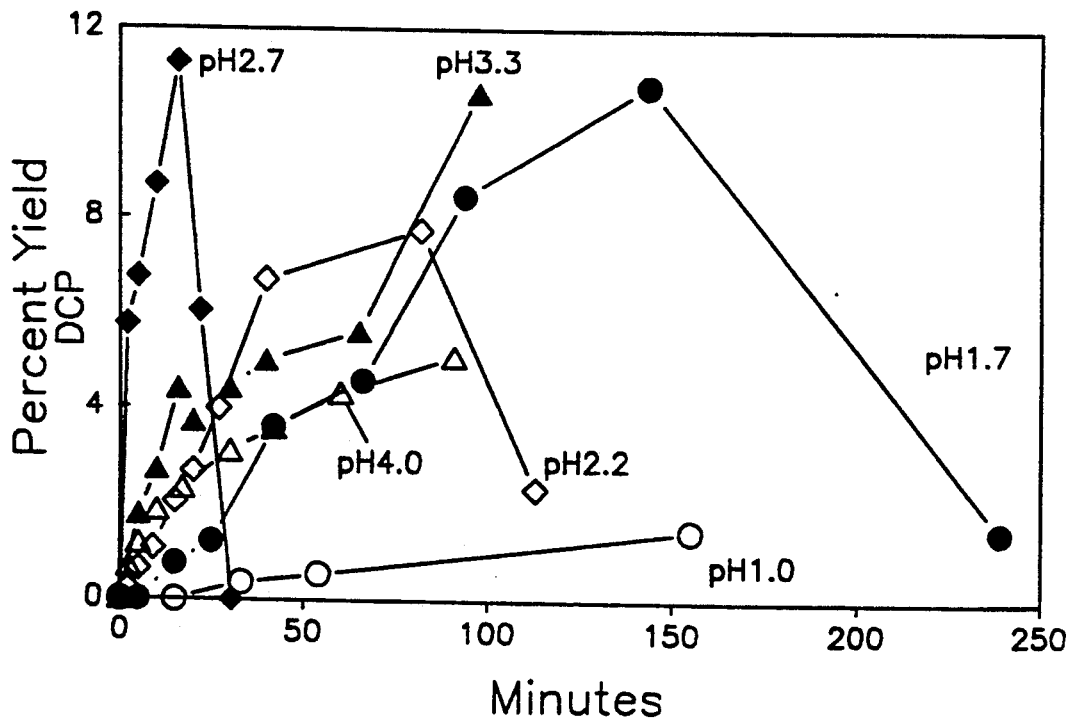

In the practice of this invention, aqueous, acidic ferric reagents are employed to degrade, preferably to substantially mineralize, organic pesticides of the type having a formula containing more than one carbon atom, notably aromatics, under mild conditions. Degradation reactions carried out in the dark require oxygen and added oxidizing agent such as peroxide. Reactions carried out in light do not require peroxide or other oxidizing agent except oxygen, but adding such an agent greatly accelerates the degradation. Preferred ferric reagents contain ferric ion and hydrogen peroxide. The reaction is preferably carried out at pHs ranging between about 1.5 and about 3.5, more preferably between about 2.5 and about 3.0.

With an inorganic or organic chelating agent, the reaction can be carried out at higher pH's, such as, for example, about pH 3.5 to about 6.0. Example chelating agents include gallic acid (3,4,5-trihydroxybenzoic acid), picolinic acid (pyridine-2-carboxylic acid), and rhodizonic acid.

Any acid can be employed to adjust the pH. Preferred acids are perchloric and nitric.

The ferric reagents employed in the degradation methods of this invention are prepared from ferric salts. Any water soluble ferric salt can be employed, but ferric chloride and ferric sulfate are not preferred. Example ferric salts include, but are not limited to, ferric perchlorate, ferric nitrate, ferric citrate, ferric malate, ferric lactate, ferric oxalate, and the like.

Where ferric ions are employed to degrade pesticides in the absence of peroxide or other oxidizing agent other than oxygen, the ferric salts can be either dissolved as solids in aqueous pesticide solutions or added to the pesticide as a stock ferric solutions; adding ferric solutions is preferred. Where peroxide or other oxidizing agent is used in concert with ferric ion to degrade pesticides, the agent can be added with the ferric ion or before or after adding ferric ion. The amounts of added ferric salts are not critical in the dark reaction, but in the light preferred ferric concentrations in the initial degradation reaction mixtures range between about 0.2 mM to about 2.5 mM.

Certain anions, including chloride and sulfate, inhibit the degradation reaction at high concentrations. Large concentrations of organic solvents such as methanol also inhibit the reaction. Therefore, the ferric reagents of this invention are preferably employed in the absence of large concentrations of chloride, sulfate, and organic solvents.

Degradation of pesticides occurs on incubation of the pesticide with ferric ion in light. In this embodiment, pesticides are degraded in aqueous solutions having a pH of about 1.5 to about 3.5, preferably about 2.5 to about 3.0, by contacting the pesticides with ferric ion in light for a time effective to achieve substantial, i.e., at least about 25% to about 30%, mineralization. By "mineralization" is meant conversion of the organic pesticide to inorganic compounds.

Bright light is preferred. By "bright" light is meant light having an intensity of at least about 1.2 $mW/cm^2$ in the visible region (400 to 700 nm) and at least about 0.035 mW/cm² in the near ultraviolet (UV, 290 to 385 nm). As is illustrated in the Examples to follow, the reaction proceeds in dim light (about 20 times less intense). Moreover, the reaction proceeds in light of near UV wavelength (~300 to ~400 nm). However, even in bright light, the degradation reaction can be relatively slow for some pesticides (e.g., only about 20 to 35% mineralization in about 10 hours).

The light reaction may be accelerated by adding an oxidizing agent other than oxygen such as a peroxide, preferably hydrogen peroxide. Oxidizing agents include but are not limited to perborate, organoperoxides and hydrogen peroxide. Therefore, peroxide, especially hydrogen peroxide, is a component of preferred ferric reagents of this invention.

Peroxide may be added to degradation reaction mixtures before, after, or with the ferric ion. Adding peroxide after the iron is preferred. Peroxide is preferably employed in amounts ranging from about 1 mM to about 500 mM in the mixture. Increasing the peroxide concentration generally increases the rate of mineralization of the pesticides.

In a preferred embodiment of the invention, pesticides are contacted, in an aqueous solution having a pH of about 1.5 to about 3.5, preferably about 2.5 to about 3.0, with a composition comprising ferric ion and hydrogen peroxide, each in amounts and for a time effective to achieve substantial mineralization of the pesticide. At least about 25% to 30% mineralization, more preferably about 50% or greater, even more preferably about 75% or greater, is preferred. Some embodiments achieve about 95% or greater mineralization. The degradation can proceed in the absence or the presence of light. Light is preferred.

By the term "pesticide" is meant compounds of the type having a formula containing more than one carbon atom, used to destroy pests, including herbicides, fungicides insecticides, rodenticides, and the like. Unsaturated pesticides, notably aromatic pesticides, are especially susceptible to degradation by the ferric reagents of this invention. Using the terminology of the *Farm Chemicals Handbook* 1990, Example pesticides include, but are not limited to flucythrinate/phorate (Aastar TM, O,O-diethyl-S-((ethylthio)methyl)phosphorodithioate) and cyano(3-phenoxyphenyl)methyl-4-(difluromethoxy)alpha(1-methyl-ethyl)benzene acetate); temephos (Abate TM, O,O'-(thiodi-4,1-phenylene)bis (O,O-dimethyl phosphorothioate); bromopropylate (Acarol TM, isopropyl 4,4'-dibromobenzilate); acetochlor (Acenit TM, 2-chloro-N-ethoxymethyl-6'-ethylacet-o-toluidide), aclonifen (2-chloro-6-nitro-3-phenoxy aniline) carbosulfan (Advantage TM, 2,3-dihydro-2,2-dimethyl-7-benzofuranyl ((dibutylamino)thio)methyl carbamate); trichloronate (Agritox TM), Akton TM (O,O-diethyl O-(2-chloro-1-(2,5-dichlorophenyl) vinyl) phosphorothioate); alachlor (2-chloro-2'-6'-diethyl-N-(methoxymethyl)-acetanilide), aldoxycarb (2-methyl-2-methylsulfonyl) propanyl O-((methylamino)carbonyl)oxime) clofop-isobutyl (Alopex TM, 2-(4-(4'-chlorophenoxy)-phenoxy)-isobutyl-propionate); alpha-cypermethrin (cyclopropanecarboxylic acid, 3-(2,2-dichloroethenyl)-2,2-dimethyl-cyano (3-phenoxyphenyl)methyl ester); alpha-napthenylacetic acid, triflumuron (Alsystin TM, 2-chloro-N-(((4-(trifluoromethoxyphenyl-)aminocarbonyl) benzamide); chloramben (Amiben TM, 3-amino-2,5-dichlorobenzoic acid), DAEP (Amiphos TM, O,O-dimethyl-S-2 (acetylamino)ethyldithiophosphate); amitraz (N-methylbis(2,4-xylyliminomethyl) amine); amlure (propyl 1,4-benzodioxan-2-carboxylate), amobam (diammonium ethylene bisdithiocarbamate); tetrasul (Animert V-101 TM, 4-chlorphenyl 2,4,5-trichlorophenyl sulfide); anthraquinone (9,10-anthraquinone); diethatyl ethyl (Antor TM, N-(chloroacetyl)-N-(2,6-diethylphenyl)glycine ethyl ester); IPSP (Aphidan TM, O,O-diisopropyl-S-ethylsulfinyl methyl dithiophosphate); niagramite (Aramite TM, 2(p-tert butylphenoxy)-isopropyl 2-chloroethyl sulfite); monolinuron (Aresin TM, N-(4-chlorophenyl)-N' methoxy-N'-methylurea); esfenvalerate (Asana TM, (S)-cyano(3-phenoxyphenyl)methyl-(S)-4-chloro-alpha (1-methylethyl) benzene acetate); Aaulam (methyl sulfanilylcarbamate); terbucarb (Azak TM, 2,6-di-tert-butyl-p-tolyl methylcarbmnate); Azithiram TM (bis-dimethylaminocarbamoyl disulfide); Banair TM (2-methoxy-3,6-dichlorobenzene); bensultap (Bancol TM, S,S'-2-dimethylaminotrimethylene di(benzene-thiosulphonate); dimethylamine salt of dicamba (Banvel TM, dimethylamine salt of 2-methoxy-3,6-dichlorobenzoic acid or dimethylamine salt of 3,6-dichloro-o-anisic acid); bentazon (Basagran TM, 3-isopropyl-1H-2,1,3-benzothiadiazin-4(3H)-one 2,2-dioxide); niclosamide (Bayluscid TM, 5-chloro-N-(2-chloro-4-nitrophenyl)-2-hydroxybenzamide compound respectively with 2-aminoethanol (1:1)); phoxim (Baython TM, 2-(((diethoxyphosphinothioyl)oxy)imino) benzene-acetonitrile); chlorphoxim (Baython C TM, 7(2-chlorophenyl)-4-ethoxy-3,5-dioxa-6-aza-4-phosphos-phaoct-6-ene-8-nitrile-4-sulfide); benazolin (4-chloro-2-oxobenzothiazolin-3-ylacetic acid); Bendiocarb TM (2,2-dimethyl-1,3-benzodixol-4-yl methylcarbamate); benodanil (2-iodo-N phenylbenzamide); exporsan (Bensulide TM, S-(O,O-diisopropyl phosphorodithioate) ester of N-(2-mercaptoethyl) benzenesulfonamide); BTC (benzalkonium chloride, alkyl dimethyl benzylammonium chloride); benzomate (JMAF) (benzoximate, ethyl O-benzoyl 3-chloro-2,6 dimeth-oxybenzohydroximate); chlorfenprop-methyl (Bidsin TM, 2-chloro-3(4-chlorophenyl)-methylpropionate); bifenox (methyl 5-(2,4-dichlorophenoxy)-2-nitroben-zoate); sulfotep (Bladafum TM, tetraethyl thiodiphosphate); sulprofos (Bolstar TM, O-ethyl-O-(4-(methylthio) phenyl)-S-propyl phosphorodithioate); bomyl (dimethyl 3-hydroxy glutaconate dimethyl phosphate); fenobcarb (BPMC, 2-(1-methylpropyl) phenyl methylcarbamate); Brodifacoum TM (3-(3-(4'-bromo(1,1'-biphenyl)-4-yl)-1,2,3,4-tetrahydro-1-napthalenyl)-4-hydroxy-2H-1-benzopyran-2-one);

Bromadiolone TM (3-(3-(4'-bromo(1,1'-biphenyl)-4-yl)-3-hydroxy-1-phenylpropyl)-4-hydroxy-2H-1-benzopyran-2-one); Bromophos TM (O(-4-bromo-2,5-dichlorophenyl)-0, 0-dimethylphosphorothioate); bromophosethyl (O-(4-bromo-2,5-dichlorophenyl) O,O-diethylphosphorothioate); Bromoxynil TM (3,5-dibromo-4-hydroxybenzonitrile); Bronopol TM (2-bromo-2-nitropropan-1,3-diol); Buban 37 TM (3', 5'-dinitro-4'-(di-n-propylamino) aceto-phenone); Butacarb TM (3,5-di-t-butylphenyl N-methylcarbamate); Butachlor TM (2-chloro-2',6'-diethyl-N-(butoxy methyl) acetanilide); Butonate TM (O,O-dimethyl-2,2,2-trichloro-1-n-butyryl-oxethyl phosphonate); Butylate TM (S-ethyl diisobutylthiocarbamate+inert safener); bufencarb (Bux TM, amorphous SiO₂); promecarb (Carbamult TM, 3-methyl-5-isopropylphenyl-N-methyl-carbamate); Carbaryl TM (1-naphthyl N-methylcarbamate); Carbetamide TM (N-ethyl-2-(((phenylamino)carbonyl)oxy) propanamide(D)-isomer) Carbofuran TM (2,3 dihydro-2,2-dimethyl-7-benzofuranyl methylcarbamate); Carboxin ™ (5,6-dihydro-2-methyl-N-phenyl-1,4-oxathiin-3-carboxamide); barban (Carbyne ™, 4-chloro-2-butynyl m-chlorocarbanilate); formetanate hydrochloride (Carzol ™, (3-dimethylamino-(methyleneimino phenyl))N-methylcarbamate hydrochloride); pyrocatechol (Catechol ™, O-Dihydroxybenzene); Cellocidin ™ (acetylene dicarboxamide); bequinox (Ceredon ™, 1,4-benzoquinone N'-benzoylhydrazone oxime); Chlomethoxynil ™ (2,4-dichlorphenyl 3-methoxy-4-nitrophenyl-ether); Chloranil ™ (2,3,5,6-tetrachloro-1,4-benzoquinone); Chlorbenside ™ (p-chlorobenzyl p-chlorophenyl sulfide); Chlordimeform ™ (N'-(4-chloro-o-tolyl)-N,N-dimethyl-forma-midine); Chlorfenson ™ (4-chlorophenyl-4-chlorobenzene sulphonate); Chlorfensulphide ™ (4-chlorophenyl 2,4,5-trichlorophenylazo sulphide); chlorflurecol-methyl ester (Chlorflurenol ™, methyl 2-chloro-9-hydroxyfluorene-9-carboxylate, methyl-9-hydroxyfluorene-9-carboxylate); Chlormephos ™ (S-chlormethyl-O,O-diethyl phosphoro-dithioate); Chlorophacinone ™ (2-((p-chlorophenyl)phenylacetyl)-1,3 indandione); Chlorophenoxy Propionic Acid ™ (2-(3-chlorophenoxy)-propionic acid); Chlorotoluron ™ (N'-(3-chloro-4-methylphenyl)-N-',-dimethyl urea); Chloroxynil ™ (3,5-dichloro-4-hydroxybenzonitrile); Chlorphoxim ™ (isopropyl m-chlorocarbanilate); Chlorpropham ™ (mixture of 3 isomers: (1) O-2,5-dichloro-4(methylthio)phenyl phosphorothoic acid O,O-diethyl ester (2) 0,2,4-dichloro-5-(methylthio)phenyl phosphorothoic acid O,O-diethyl ester (3) 0,4,5-dichloro-2-(methylthio) phenyl phosphorothoic acid O,O-diethyl ester); chlornitrofen (CNP ™, 2,4,6-trichlorophenyl-4-nitrophenyl ether); CGA-92194 (Concep II ™, N-(1,3-dioxolan-2-yl-methoxy)-iminobenzene-acetonitrile); Conen ™ (O-butyl-S-benzyl-S-ethyl phosphorodithioate); Coumochlor ™; 4-CPA ™ (parachlorophenoxyacetic acid); ethiofencarb (Croneton ™, 2-(ethylthiomethyl) phenyl methylcarbamate); Crotoxyphos ™ (dimethyl phosphate of alpha-methylbenzyl 3-hydroxy-cis-crotonate); profenfos (Curcacron ™, O-(4-bromo-2-chlorophenyl)-O-ethyl S-propyl phosphorthioate); Cyanofenphos ™ (4-cyanophenylethylphenyl phosphonothioate); Cyanphos ™ (O-4-cyanophenyl O,O-dimethyl phosphorothioate); mephosfolan (Cytrolane ™, 2-(diethoxyphosphinylimino)-4-methyl-1,3-dithiolane); 2,4-D ™ ((2,4-dichlorophenoxy) acetic acid); DCPA (Dacthal ™, dimethyltetrachloroterephthalate); PTMD (Danifos ™, S-((p-Chlorophenl) thio)methyl)O,O-diethyl phosphorothioate); fensulfothion (Dasanit ™, O,O-diethyl O-(4-methylsulfinyl)phenyl) phosphorothioate); 2,4-DB ™ (4-(2,4-dichlorophenoxy) butyric acid); DCNA ™ (2,6-dichloro-4-nitroaniline); 2,4-DEB ™ (2,4-dichlorophenoxyethyl benzoate); butifos (DEF ™, S,S,S,-tributylphosphorotrithioate); 2,4-D acetate (Defy ™); Demephion-S ™ (O,O-dimethyl S-(2(methylthio)ethyl) phosphorothioate); Desmedipham ™ ($C_{16}H_{16}N_2O_4$); napropamide (Devrinol ™, 2-(a-naphthoxy)-N,N-diethylpropionamide); bromsalans (Diaphene ™, a halogenated salicylanilide); dibutyl phthalate; Dicamba ™ (2-methoxy-3,6-dichlorobenzoic acid); Dichlofenthion ™ (O-2,4-dichlorophenyl O,O-diethylphosphoro-thioate); Dichlone ™; Dichlorprop ™ (2-(2,4-dichlorophenoxy)-propionic acid); dichlorprop-P ™ ((R)-2-(2,4-dichlorophenoxy) propionic acid); chloranocryl (Dicryl ™); Diethofencarb ™ (isopropyl 3,4-diethoxyphenylcarbamate); Dimanin ™ (alkyldimethylbenzylammonium chloride); Dimethoate ™ (O,O-dimethyl-S-(N-methylcarbamoylmethyl) phosphorodithioate); Dimethyl Phthalate ™; Diphenamid ™ (N N-dimethyl-2,2-diphenylacetamide); dipan (Diphenatrile ™); Diphenylamine ™; Disulfoton ™ (O,O-diethyl S-(2-(ethylthio)ethyl))phosphoro-dithioate); oxydisulfoton (Disyston S ™, O,O-diethyl S-(2-(ethylsulfinyl) ethyl) phosphorodithioate); Ditalimfos ™ (O,O-diethyl phthalimido-phosphonothioate); Dithianon ™ (5,10-dihydor-5,10-dioxonaphtho(2,3b)-p-dithiin-2,3-dicarbonitrile); Diuron ™ (3-(3,4-dichlorophenyl)-1,1-dimethylurea+N'-(3,4-dichlorophenyl)-N,N-dimethylurea); 2-phenylphenol (Dowicide 1 ™, 99% orthophenylphenol); Dowicide A ™ (97% Sodium o-phenylphenate); thiocarbazil (Drepamon ™, S-benzyl N,N-di-sec-butylthiolcarbamate); fonofos (Dyfonate ™, 0-ethyl-S-phenylethylphosphonodithioate); Edifenphos ™ (0,ethyl S,S-diphenyl phosphorodithioate); isoxaben (El-107 ™, N-(3-(1-ethyl-1-methylpropyl)-5-isoxazolyl))-2,6-dimethoxybenzamide); dioxacarb (Elocron ™, 2-(1,3-dioxalan-2-yl)phenyl-N-methylcarbamate); Endothion ™; alpha-chlorohydrin (Epibloc ™, 3-chloro-1,2-propanediol); EPN ™ (0-ethyl 0(4-nitrophenylphenylphosphonothioate); buturon (Eptapur ™); eptam (EPTC ™, S-ethyl dipropylthiocarbamate); Ethiolate ™ (S-ethyl diethylthiocarbamate); Ethion ™ (0,0,0,0-tetraethyl S,S-methylene bis (phosphorodithioate); Ethoprop ™ (0-Eehyl S,S-dipropyl phosphorodithioate); chlorfenac (Fenatrol ™, (2,3,6-trichlorophenyl) acetic acid); Fenfuram ™ (2-methylfuran-3-carboxanilide); Fenoxaprop-Ethyl ™ ((±)-ethyl 2-(4-((6-chloro-2-benzoxazolyl) oxy)-phenoxy)propanoate); Fenoxycarb ™ (ethyl (2-(4-phenoxyphenoxy)ethyl)carbamate); Fenpropimorph ™ ((±)-cis-4-(3-tert-butylphenyl)-2-methylpropyl)-2,6-dimethylmorpholine); Fenthion ™ (O,O-dimethyl 0-(3-methyl-4-(methylthio) phenyl)-phosphorothioate); Fenuron ™ (3-phenyl-1,1-dimethylurea); Fenvaler ate ™ ((RS)-alpha-cyano-3-phenoxybenzyl (RS)-2-(4-chlorophenyl)-3-methylbutyrate); Ferbam ™ (ferric dimethyldithiocarbamate); ethychlozate (Figaron ™, ethyl 5-chloro-3-(1H)-indazolyl-acetate); ethoate-methyl (Fitios B/77 ™, N-ethylamide of O,O-dimethyl dithiophosphorylacetic acid); flurecol-n-butylester (Flurecol ™, n-butyl-9-hydroxyfluorene-9-carboxylate); tribufos (Folex 6EC ™, S,S,S-tributyl phosphotrithioate); omethoate (Folimat ™, O,O-dimethyl S-(2-(methylamino)-2-oxothyl)) phosphorothioate); furalaxyl (Fongarid ™, methyl N-2,6-dimethylphenyul-N-furoyl(2)-alaninate); phosethyl Al (Fosetyl-Al ™, aluminum tris(0-ethyl phosphonate); 3-CPA (Fruitone CPA ™, 2-(3-chlorophenoxy) propionic acid); fuberidazole (Fuberidazol ™, 2(2'-furyl)-1H-benzimidazole); Fujithion ™ (S-(p-chlorophenyl) O,O-dimethyl phosphoro-thioate); benalaxyl (Galben ™, methyl-N-phenylacethyl-N-2,6-xylylaninate); Gallic Acid ™; benazolin (Galtak ™, 4-chloro-2-oxobenzothiazolin-3-ylacetic acid); benzthiazuron (Gatnon ™, N-2-benzothiazoly)-N'-methylurea); phorazetim (Gophacide ™, O,O-bis(p-chlorophenyl) acetimodyl-phosphoramidothioate); Griseofulvin ™ (7-chloro-4,6-dimethoxycoumaran-3-one-2-spiro-1-(2'-methoxy-6' methylcyclohex-2'-en-4'-one); EXD (Herbisan #5 ™, diethyl dithiobis (thinoformate): Hexachlorophene ™ (2,2'methylene bis(3,4,6-trichlorophenol); diclofop-methyl (Hoelon 3EC ™, 2-(4-(2',4'-dichlorophenoxy)-phenoxy) methyl propanoate); isothioate (Hosdon ™); allyxycarb (Hydrol ™, 4-Diallylamino-3,5-dimethylphenyl-N-methylcarbamate); IBP ™ (O,O-diisopropyl-S-benzyl thiophosphate); Indole-3-Acetic Acid ™; IBA (indole-3-butyric Acid ™, indole-3-butyric Acid); Ioxynil ™ (4-hydroxy-3,5-diiodobenzonitrile); propham (IPC ™, isopropyl carbanilate); Isofenphos ™ (1-methylethyl 2-(ethoxy((1-methylethyl)-amino)phosphinothioyl)oxy)benzoate); Isopropyl Ester 2,4-D ™ (2,4-dichlorophenoxyacetic acid, isopropyl ester); Isoproturon ™ (N-(4-isopropylphenyl)-N',N,-dimethylurea); Karbutilate ™; isoxathion (Karphos ™, O,O-diethyl-0-(5-phenyl-3-isoxazoly) phosphorothioate); Karsil ™ (N-(3,4-Dichlorophenyl)-2-methyl pentanamide); pronamide (Kerb ™, 3,5-dichloro-N-(1,1-dimethyl-2-propynyl) benzamide); Kinoprene ™ (2-propynl (E,E)-3,7,11-trimethyl-2,4-dode-cadienoate); Landrin ™ (Approx. 4:1 ratio of 3,4,5- and 2,3,5- isomers of trimethylphenyl methylcarbamate); alachlor (Lasso ™, 2-chloro-2',6'-diethyl-N-(methoxymethyl)-acetanilide); fenaminosulf (Lesan ™, sodium (4-(dimethylamino)phenyl) diazene sulfonate); Linuron ™ (3-(3,4-dichlorophenyl)-1-methoxy-1-methylurea); difenoxuron (Lironion ™, N-4-(p-methoxy-phenoxy)-phenyl)-N',N'-dimethylurea); Malathion ™ (O,O-dimethyl phosphorodithoate of diethyl mercaptosuccinate); chlorbromuron (Maloran ™, 3-(4-bromo-3-chlorphenyl)-1-methoxy-1-methylurea); aminocarb (Metacil ™); MCPA ™ ((4-chloro-2-methylphenoxy) acetic acid); MCPB ™ (4-((4-chloro-o-tolyl)oxyl) butyric acid); MCPCA ™ (2'-chloro-2-(4-chloro-o-tolyoxy) acetanilide); MCPP (Potassium Salt) ™ (potassium salt of 2-(2-methyl-40-chlorophenoxy) propionic acid); Mecarphon ™ (S-(N-methoxycarbonyl-N-methylcar bamoylmethyl) dimethyl phosphonothithioate); MCPP (Mecoprop ™, 2-(4-chloro-2-methylphenoxy) propionic acid); Mecoprop-P ™ ((R)-2-(4-chloro-2-methylphenoxy)propionic acid); xylylcarb (Meobal ™, 3,4-dimethylphenylmethylcarbamate); Mepronil ™ (3'-isopropoxy-2-methylbenzanilide); Metaldehyde ™ (polymer of acetaldehyde); Metam-sodium ™ (sodium N-methyldithiocarbamate); demeton methyl (Metasystox ™, S-(2-ethylthioethyl)O,O-dimethyl phosphorothioate); demeton-S-methyl (Metasystoxi ™, S-(2(ethylthio)ethyl)0,0-dimethylphosphoro-thioate); demeton-S-methyl sulfoxid (metasystox-R ™, s-(2-ethylsulfinyl)ethyl)O,O-dimethyl); Methiocarb ™ (3,5-dimethyl-4-(methylthio)phenol methylcarbamate); Methiuron ™ (1-(m-methylphenyl)-3,3-dimethylthio-urea); Methyl Eugenol ™ ((4-allyl-1,2 dimethoxybenzene); Metobromuron ™ (3-(4-bromophenyl)-1-methoxy-1-methylurea); Metolachlor ™ (2-chloro-N-(2-ethyl-6-methylphenyl)-N-(2-methoxy-1-methylethyl)acetamide); Metoxuron ™ (N-(3-chloro-4-methoxyphenyl)-N,N-dimethyl-urea); Mexacarbate ™ (4-dimethylamino-3,5-xylyl N-methylcarbamate); Mibex ™ (4-chlorophenyl-2,4,5-trichlorophenyl-azosulfide mixed with 1,1-bis-(4-chlorophenyl) ethanol); isoprocarb (MIPC ™, 2-(1-methylethyl)phenyl methylcarbamate); ACN (Mogeton G ™, 2-amino-3-chloro 1,4-naphthoquinone); Monocrotophos ™ (dimethyl-(E)-1-methyl-2-(methylcarbomyl)-vinyl phosphate); Monuron ™ (3-(p-chlorophenyl)-1,1'-dimethylurea); MTMC ™ (m-tolyl-N-methylcarbamate); Napthalene ™; NAD (Napthaleneacetamide ™); 1-Naphthaleneacetic Acid ™; Naptalam ™ (sodium-2-(1-napthalenylamino) carbonyl) benzoate); Neburon ™ (1-n-butyl-3-(3,4-dichlorophenyl)-1-methylurea); diamidfos (Nellite ™);

fenamiphos (Nemacur ™, ethyl 3-methyl-4-(methylthio)phenyl (1-methylethyl)phosphoramidate) CPCBS (Neosappiran ™, p-chlorophenyl p-chlorobenzenesulfonate); DCPM (Neotran ™, bis (p-chlorophenoxy)methane); fosmethilan (Nevifos ™, S-(N-(2'-chlorobutyranilido-methyl))-O,O-dimethyl phosphorodithioate); N-phenyl phtalimic acid (Nevirol ™, 2-aminocarbonylphenyl-benzoic acid); Niacide ™ (mercaptobenzothiazole); Nitrofen ™ (2,4-dichlorophenyl-p-nitrophenyl ether); N,N-Diethylbenzamide ™ (N,N-diethylbenzamide); iodofenphos (Nuvanol N ™, O,O-dimethyl-0-(2,5-dichloro-4-iosphenyl) phosphorthioate); Ofurace ™ (2-chloro-N-(2,6-dimethylphenyl)-N-(tetrahydro-2-oxo-3-furanyl)acetamide); dimethachlon (Ohric ™, N-(3,5-dichlorophenyl)succinimide); Orbencarb ™ (S-(2-chlorobenzyl)-N,N-diethylthiolcarbamate); Ovex ™ (p-chlorophenyl-p-chlorobenzenesulfonate); Oxadixyl ™ (2-methoxy-N-(2-oxo-1,3-oxazolidin-3yl) acet-2',6'-xylidide); Oxycarboxin ™ (5,6-dihydro-2-methyl-N-phenyl-1,4-oxathiin-3-carboxamide-4,4-dioxide); fenothiocarb (Panocon ™, S-(4-phenoxybutyl)-N,N-dimethyl thocarbamate); PCP ™ (pentachlorophenol); Phencapton ™ (O,O-diethyl S-(2,5-dichlorophenylthio-methyl) phosphorodithioate); phenmedipham ™ (methyl-m-hydroxycarbanilate-m-methylcarbanilate ester); Phenothiol ™ (S-ethyl(4-chloro-0-tolyoxy) thioacetate); Phenthoate ™ (O,O-dimethyl S-(alphaethoxycarbonylbenzyl)-phosphorodithioate); Phorate ™ (O,O-diethyl S-((ethylthio) methyl) phos-phorodiothioate); Phosalone ™ (S-((6-chloro-2-oxo-3(2H)-benzoxazolyl)methyl) O,O-diethyl phosphordithioate); Phosmet ™ (N-(mercaptomethyl) phthalimide S-(O,O-dimethylphosphorodithioate); leptophos (Phosvel ™, 0-(4-Bromo-2,5-dichlorophenyl) 0-methyl-phenyl-phosphonothioate); Piperonyl Butoxide ™ (alpha-(2-(2-butoxyethoxy)ethoxy)-4,5-methylenedioxy-2-propyltoluene); glyphosine (Polaris ™, N,N-bis(phosphonmethyl) glycine); monalide (Potablan ™, N-(4-chlorophenyl)-2,2-dimethylvaleramide); chlorthiamid (Prefix ™, 2,6-dichlorothiobenzamide); prothiocarb (Previcur ™, ethyl-N-(3-dimethylamino-propyl)-thiolcarbamate) hydrochloride); methazole (Probe ™, 2-(3,4-dichlorophenyl)-4-methyl-1,2,4-oxadiazolidine-3,5-dione); Propachlor ™ (2-chloro-N-isopropylacetanilide); Propamocarb Hydrochloride ™ (propyl (3-(dimethylamino)propyl) carbamate monohydrochloride); Propanil ™ (N-(3,4-dichlorophenyl) propionamide); Propetamphos ™ ((E)-0-2-isopropoxy-carbonyl-1-methylvinyl 0-methyl ethylphosphoramidothioate); Propoxur ™ (2-(1-methlyethoxy)phenyl methylcarbamate); 1,8-naphthalic anhydride (Protect ™); Prynchlor ™ (2-chloro-N-(1-methyl-2-propynyl)acetanilide); chlorfenethol (Qikron ™, 1,1-bis(4-chlorophenyl)ethanol); Quinazimid ™ (p-benzoquinone monosemicarbazone); CDAA (Randox ™, N,N-diallyl-2-chloroacetamide); Rhodethanil ™ (3-chloro-4-(ethylamino)phenyl thiocyanate); tolclofos (Rizolex ™, 0-2,6-dichloro-4-methylphenyl O,O-dimethyl phosphorothioate); sirmate (Rowmate ™, 3,4-and 2,3-dichlorobenzyl N-methyl-carbamate); dioxabenzofos (Salithion ™, 2-methoxy-4H-1,3,2-benzodioxaphosphorin-2-sulfide); C-10015 (Saprecon C ™); dichlozoline (Sclex ™, 3-(3,5-dichlorphenyl)-5,5-dimethyl oxazoline-dione-2,4); Sesone ™ (sodium 2,4-dichlorophenoxyethyl sulfate); pyracarbolid (Sicarol ™); Silvex ™ (2-(2,4,5-trichlorophenoxy)propionic acid); Sodium Pentachlorophenate ™; Sophamide ™ (O,O-

Dimethyl s-(N-methoxymethyl)carbamoylmethyl) phosphorodithioate); EPBP (S-Seven ™, 0-ethyl-0-(2,4-dichlorophenyl)-phosphonothionate); benzoylprop ethyl (Suffix ™, ethyl N-benzoyl-N-(3,4-dichlorophenyl)-DL-alaniate); esfenvalerat (Sumi-alpha ™, (S)-alpha-Cyano-3-phenoxybenzyl (S)-2-(4-chlorophenyl)-3-methylbutyrate); cyanofenphos (Surecide ™, 0-P-cyanophenyl 0-ethyl phenyl-phos-phorothioate); Swep ™ (methyl-N-(3,4-di-chlorophenyl) carbamate); 2,4,5-T (2,4 5-trichlorophenoxy-acetic acid); chloroxuron (Tenoran ™, 3-(p-(p-chlorophenoxy) phenyl)-1,1-di-methylurea); chloroneb (Terraneb SP ™, 1,4-dichloro-2,5-dimethoxybenzene); Tetrachlorvinphos ™ ((Z)-isomer of the compound 2-chloro-1(2,4,5-trichlorophenyl)vinyl dimethyl phosphate); benthiocarb (Thiobencarb ™, S-((4-chlorophenyl)methyl)diethylcarba-mothioate); Thiometon ™ (S-(2-(ethylthio)ethyl) 00-dimethyl phosphorodithioate); TIBA ™ (2,3,5-triodobenzoic acid compound with N-methylmethanamine); pebulate (Tillam ™, S-propyl butylethylthiocarbamate); 2,3,6-TBA (trichlorobenzoic Acid); Trimethacrb ™ (3,4,5-+2,3,5-isomers of trimethylphenyl methyl carbamate); carbophenothion (Trithion ™); phenisopham (Verdinal ™, 3-isopropoxycarbonyl-aminophenyl-N-ethyl carbanilate); Warfarin ™ (3(a-acetonylbenzyl)-4-hydroxycoumarin); XMC ™ (3 5-xylyl N-methyl carbamate); and Zytron ™ (0-(2,4-dichlorophenyl) 0'-methyl N-isopropylphosphoroamidothioate).

The following pesticides can also be degraded by the ferric reagents of this invention, but at a slower rate: Atrazine (Aatrex ™, 2-chloro-4-ethylamino-6-isopropylamino-s-triazine); acifluorfen (sodium 5-(2-chloro-4-(trifluoromethyl)phenoxy)-2-nitrobenzoate); cycloheximide (Acti-dione ™, 3(2-(3,5-dimethyl-2-oxocyclohexyl)2-hydroxyethyl-)glutarimide); pyrazophos (Afugan ™, 0-6-ethoxycarbonyl-5-methylpyrazolo (1,5.-a)pyrimidin-2-yl O,O-diethyl phosphorothioate); metsulfuron methyl (Ally ™, methyl 2-(((((4-methoxy-6-methyl-1,3,5-triazin-2-yl)amino)carbonyl-)amino)sulfonyl)benzoate); triasulfuron (Amber ™ 2-(2-chloroethoxy)-N-(((4-methoxy-6-methyl-1,3,5-triazin-2-yl)amino)carbonyl)benzenesulfonamide, ametryn (2-(ethylamino)4-isopropylamino-6-methyl-thio-striazine): amidithion (O,O'-dimethyl-S-(N-methoxyethyl)-carbamoyl-methyl-phosphorodithioate); hexaconazole (Anvil ™, 2-(2,4-dichlorophenyl)-1-(1H-1,2,4-triazol-2-yl)2-ol); buprofezin (Applaud ™, 2-tert-butylimino-3-isopropyl-5-phenylperhyxro-1,3,5-thiadiazin-4-one ; ancymidol (A-Rest ™, a-cyclopropyl-a-(p-methoxyphenyl)-5-pyrimidinemethanol); dinoseb acetate (Aretit ™, 0-acetyl-2-sec, butyl-4,6-dinitrophenol); cimmethylin (Argold ™, exo-1-methyl-4-(1-methylethyl)-2-(2-methyl phenyl methoxy)-7-oxabicyclo-(2.2.1) heptane); Arsenal ™ (2-(4-isopropyl-4-methyl-5-oxo-2-imidazolin-2-yl)nicotinic acid with isopropylamine (1:1)); AC 222,293 (Assert ™, mixture of methyl-2-(4-isopropyl-4-methyl-5-oxo-2-imidazolin-2-yl)-p-toluate and methyl-6-(4-isopropyl-4-methyl-5-oxo-2-imidazolin-2-yl)-m-toulate); difenzoquat methyl sulfate (Avenge ™, 1,2-dimethyl-3,5-diphenyl-1 H-pyrazolium methyl sulfate); piperophos/dimethametryn (Avirosan ™, O,O-dipropyl S-2 methylpiperidinocarbonylmethyl phosphorodithioate); Azinophos-ethyl ™ (O,O-diethyl S ((4-oxo 1,2,3-benzotriazin-3(4H)-yl)methyl)phosphorodithioate); Azinphos-methyl ™ (O,O-dimethyl-S-(4-oxo-1,2,3-benzotriazin 3(4H)-yl)methyl) phosphorodithioate); 6-benzylaminopruine (BAP ™, 6-benzyladenine); fluchoralin (Basalin ™, N-(2-chloroethyl-alpha, alpha, alpha-trifluoro-2,6-dinitro-N-propyl-p-toluidine); tebuconazole (Bay HWG 1608 ™, (±)alpha(2-(4-chlorophenyl)ethyl)-alpha-(1,1-dimethylethyl)-alpha-(2-(4-chlorophenyl)ethyl)-alpha-(1,1-dimethylethyl)-1H 1,2,4 triazole-1-ethanol); ethiozin (Bay SMY 1500 ™, 4-amino-6,1-dimethylethyl)-3-(ethylthio-1,2,4-triazin-5(4H)-one); bitertanol (Baycor ™, beta-(1,1' biphenyl)-4-yloxy-alpha-(1,1-dimethylethyl)-1H-1,2,4 triazole-1-ethanol); triadimefon (Bayleton ™, 1-(4-chlorophenoxy-3,3-dimethyl-1-(1H-1,2,4 triazol-1-yl)-2-butanone); triadimenol (Baytan ™, beta-(4-chlorophenoxy)-alpha-(1,1-dimethyl ethyl)-1H 1,2,4 triazole-1-ethanol); cyfluthrin (Baythroid ™, cyano(4-fluoro-3-phenoxyphenylmethyl 3(2,2-dichloroethenyl) 2,2-dimethylcyclopropanecarboxylate); primisulfuron (Beacon ™, 3-(4,6-bis(difluoromethoxy)-pyrimidin-2-yl)-1-(2-methoxycarbony 1-phenylsulfonyl)-urea); Benefin ™ (N-butyl-N-ethyl-a,a,a-trifluoro-2,6-dinitro-p-toluidine); Benomyl ™ (methyl 1-(butylcarbamoyl)-2-benzimi-dazolecarbamate); Bifenthrin ™ ((2 methyl (1,1'-biphenyl)-3-yl)methyl 3-(2-chloro-3,3,3-trifluoro-1-propenyl)-2,2-dimethylcyclopropanecarboxylate); Blasticidin-S ™ (1-(1'-cytosinyl)-4-(L-3'amino-5'-(1"-N-methyl-guanidino)-valer ylamino; cb-1,2,3,4-tetraoxy-beta-D-erythro-hex-2-ene uronic acid); Bromethalin ™ (N-methyl-2,4-dinitro-N-(2,4,6-tribromophenyl)-6-(trifluromethyl)benzenamine); Brompyrazon ™ (5-amino-4-bromo-2-phenylpyridazin-3-one); Buminafos ™ (1-butylamino-cyclohexane phosphonic acid-dibutylester); metazachlor (Butisan S ™, 2-chloro-N-(2,6-dimethylphenyl)-N-(1H-pyrazol-1-ylmethyl)-acetamide); Butocarboxim ™ (3-(methylthio-2-butanone-0-((methylamino)carbonyl)-oxime); tridemorph (Calixin ™, reaction mixture of $C_{11}$–$C_{14}$ 4-alkyl-2,6-dimethylmorpholine homologues containing 60 to 70% of 4-tridecyl isomers); Captafol ™ (cis-N-((1,1,2,2-tetrachloroethyl) thio)4-cyclohexene-1, 2-dicarboximide); Captan ™ (cis-N-trichloromethyltio-4-cyclohexene-1,2-dicarboximide); MC-833 (Carbamorph ™, N-(dimethyldithiocarbamoylmethyl) morpholine): Carbendazin ™ (methyl benzimidazol-2-ylcarbamate) flufenoxuron (Cascade ™, 1-(4-(2- chloro-alpha,alpha,alpha-trifluoro-p-tolyloxy-2-fluorophenyl)-3(2,6-diflurobenzoyl)urea); crimidine (Castrix ™, 2-chloro-N,N 6-trimethyl-4-pyrimidine); fentiazon (Celdion ™, 3-benzylideneamino-4-phenylthiazoline-2-thione); Chinosol ™ (8-hydroxy quinoline sulfate); Chlormequatchloride ™ (2-chloroethyl-N,N,N-trimethylammonium chloride); Chlorothalonil ™ (tetrachloroisophthalonitrile); Chlorpyrifos ™ (O,O-diethyl 0-(3,5,6-trichloro-pyridin-2-yl)phosphorothioate); cypromid (Clobber ™, 3',4'-dichlorocyclopropane carboxanilide); Clopyralid ™ (3,6-dichloropicolinic acid); lactofen (Cobra ™, 1'-(carboethoxy)ethyl 5-(2-chloro-4-(trifluoro methyl)phenoxyl)-2-nitrobenzoate); clomozone (Command ™, 2-(2-chlorphenyl)methyl-4,4-dimethyl-3-isox-azolidinone); CGA-133205 (Concep III ™, 1-(4-chlorophenyl)2,2,2-trifluorethanone-o-(1,3-dioxolan-2-ylmet hyl)oxime); terbufos (Counter ™, S-(((1,1-dimethylethyl thio) methyl) O,O-diethyl phosphorodithioate); Cyanazine ™ (2-((4-chloro-6-(ethylamino)-S-triazin-2-y)amino)2-methylpropionitrile; Cycloate ™ (S-ethyl-N-cyclohexyl-N-ethylthiocarbamate); Cycluron ™ (3-cycloctyl-1,1-dimethylurea); Cyhexatin ™ (tricyclohexylhydroxystannane); Cymoxanil ™ (2-cyano-N-((ethylamino) carbonyl)-2-(meth-oximino)acetamide); phosfolan (Cynogan ™, 2-(diethoxyphosphinylimino)-1,3-dithiolane); Cypendazole ™ (1-(5-cyanopentycarbamoyl-2-(methoxycar-bonylamino)-benzimiadazole); Cypermethrin ™ ((±)alpha-cyano-3-phenoxybenzyl (±)cis,-trans-(3(2,2-dichlorovinyl)-2,2-methylcyclorpropanecarboxylate); Cypofuram ™ (3-chloro-N-(2-oxperhydro-3-furyl)-cyclopropane-carboxanilide); AL3-52713 (Cyromazine ™, N-cyclopropyl-1,3,5-triazine-2,4,6-triamine); Dalapon ™ (2,2-dichloropropionic acid); Daminozide ™ (butanedioic acid mono (2,2-dimethyl hydrazide); Dazomet ™ (tetrahydro-3,5-dimethyl-2H 1,3,5-thiadiazine-2-thione); DDT ™ (dichloro diphenyl trichloroethane); DDVP ™ (2,2-dichlorovinyl dimethyl phosphate); deltamethrin (Decis ™, (S)-alpha-cyano-m-phenoxybenzyl (1R, 3R)-3(2,2-dibromovinyl)-2-dimethylcyclopropane-carboxylate); Dehydroacetic acid ™ (3-acetyl-6-methyl-2,4 pyradione); Deslcorn ™ (sodium ethylxanthogenate); Diazinon ™ (O,O-diethyl 0(2-isopropyl-4-methyl-6-pyrimidinyl) phosphorothioate); Dicapthon ™ (0-(2-chloro-4-nitrophenyl) O,O-dimethyl phosphorothioate); Dichlobenil ™ (2,6-dichlorobenzonitrile); Dichloroethyl Ether ™ (2,2'-dichloroethyl ether); Dichlorpropene ™ (1,3-dichloropropene); Dicofol ™ (4,4-dichloro-alpha-trichloro-methylbenzhydrol); Dicrotophos ™ ((E)-2-dimethylcarbamoyl-1-methylvinyl dimethyl phosphate); Dienochlor ™ (bis(pentachloro-2,4-cyclopentadien-1-yl); Diflubenzuron ™ (1-(4-chlorphenyl)3-(2,6 difluorobenzoyl) urea); Diflufenican ™ (2,4-difluoro-2-(a,a,a-trifluoro-m-tolyloxy)nicotinanilide); Diftoran ™ (2,2-bis(4-fluoroethoxyphenyl) propane); Dikegulac Sodium ™ (sodium salt of 2,3:4,6-di-0-isopropylidene-alpha-L-xylo-2-hexalofuranosonic acid); Dilan ™; Dimefox ™ (bis (dimethylamino) fluorophosphine oxide); Diniconazole ™ ((E)-1-(2,4-dichlorophenyl)-4,4-dimethyl-2-(1,2,4-triazol-1-yl)-1-penten-3-ol): chemox (2,4-dinitrophenol); Dinobuton ™ (2-(1-methyl-2- propyl)-4,6-dinitrophenyl isopropylcarbonate); Dinopenton ™ (isopropyl 2-(1-methylbutyl)-4,6-dinitrophenyl carbonate); Dinoseb ™ (2(sec-butyl)-4,6-dinitrophenol); Dinosulfon ™ (S-methyl 0-(2-(1-methylheptyl)-4,6-dinitrophenyl) thiocarbonate); Dinoterb Acetate ™ (2-tert-butyl-4,6-dinitrophenyl acetate); dinoterb (Dinoterb Salts ™, (2-tert-butyl-4,6-dinitrophenol); dinoterbon ™ (2-tert-butyl- 4,6-dinitrophenyl ethyl carbonate); Dioxathion ™ (2,3-p-dioxanedithiol.S,S-bis-(O,O-diethyl phosphorodithioate); biphenyl (Diphenyl ™); Dipropalin ™ (N,N-di-n-propyl-2,6-dinitro-4-methylaniline); Diquat ™ (1,1'-ethylene-2,2'-bipyridylium ion; DNOC ™ (4,6-dinitro-o-cresol); Dodecin ™ (N-(2-(2-(dodecylamino)ethyl) amino)ethyl glycine); Dodine ™ (n-dodecylguanidine acetate); fenuron-TCA (Dozer ™, 1,1-dimethyl-3-phenylurea trichloroacetate); thidiazuron (Dropp ™, N-phenyl-N'-1,2,3-thiadiazol-5-yl urea); Dymron ™ (1-(alpha,alpha-dimethylbenzyl)-3-p-tolyl urea); anilazine (Dyrene ™, 4,6-dichloro-N-(2-chlorophenyl)-1,3,5-triazin-2-amine); Endothall ™ (7-oxabicyclo (2,2,1)heptane-2,3-dicarboxylic acid); thioquinox (Eradex ™, 2,3-quinoxalinedithiol cyclic trithiocarbonate); Erbon ™ (2-(2,4,5-trichlorophenoxy)ethyl 2,2 dichloro-propionate); thiazafluron (Erbotan ™, N,N'-dimethyl-N-5-(trifluoromethyl) 1,3,4-thiadiazol)-2-yl urea); Etaconazole ™; secbumeton (Etazine ™, 2-sec-butylamino-4-ethylamino-6-methoxy-striazine); Ethephon ™ ((2-chloroethyl)phosphonic acid); Ethirimol ™ (5-butyl-2-ethylamino-4-hydroxy-6-methylpyrimidine); Etinofen ™ (2-ethoxymethyl-4,6-dinitrophenol); Etridazole ™ (5-ethoxy-3-trichloromethyl-1,2,4-thiadiazole); Etrimfos ™ (0-(6-ethoxy-2-ethyl-4-pyrimidinyl)O,O-dimethylphosphorothioate); dichlofluanid (Euparen ™, 1,1-dichloro-N-((dimethylamino) sulfonyl)-1-fluoro-N-phenylmethanesulfenamide); tolylfluanid (Euparen M ™, 1,1-dichloro-N-((dimethyl amino) sulfonyl)-1-fluoro-N-(4-methylphenyl) methan sulfenamide); quinclorac (Facet ™, 3,7-dichloro-8-quinolinecarboxylic acid); bromofenoxim (Faneron ™, 3,5-dibromo-4-hydroxybenzaldehyde-0-(2',4'-dinitro-phenyl)oxime); Far-Go ™, (triallate+aromatics +emulsifier); Fenazaflor ™ (phenyl 5,6-dichloro-2-trifluoromethyl-1-benzimidazole-carboxylate); Fenitrothion ™ (O,O-dimethyl 0,4-nitro-m-tolyl phosphorothioate); Fenpropathrin ™ ((RS)-alpha-cyano-3-phenoxybenzyl 2,2,3,3-tetramethylcyclopropanecarboxylate); Fenson ™ (p-chlorophenyl benzenesulfonate); Flamprop-Methyl ™ (methyl N-benzoyl-N-(3-chloro-4-fluorophenyl)-DL-alaninate); Fluazifop-butyl ™ (RS butyl 2-(4-(5-trifluoromethyl-2-pyridol oxy) phenoxy) propinoate); Flucythrinate ™ ((±)-cyano(3-phenoxyphenyl)methyl (+)-4-(difluoromethoxy)-alpha-(1-methylethyl) benzeneacetate); Fluometuron ™ (1,1-dimethyl-3-(a,a,a- trifluoro-m-tolyl) urea); Fluorobenside ™ (p-chlorobenzyl p-fluorophenyl sulfide); Fluorodifen ™; Fluvalinate ™ ((alpha-RS,2R)-fluvalinate ((RS-alpha-cyano-3-phenoxybenzyl-(R)2-(2-chloro-4-(tritluoromethyl)an ilino)-3-methyl-butanoate); cycloxydim (Focus ™, 2-(1-(ethoxyimino)butyl)-3- hydroxy-5-((2H)-tetrahydrothipropyran-3-yl)-2-cyclohexene-1-one); Folpet ™ (N-trichloromethyl) thio)phthalimide); Fomesafen ™ (5-(2-chloro-4-(trifluoromethyl) phenoxy)-N-(methylsulfonyl)-2-nitrobenzamide); trifenmorph (Frescon ™, N-tritylmorpholine); Terbuthylazine (Gardoprim ™, 4-tert, butylamino-2-chloro-6-ethylamino-s-triazine); chlorsulfuron (Gladz ™, 2-Chloro-N((4-methoxy-6-methyl-1,3,5 triazin-2-yl) aminocarbonyl)-benzenesulfonamide); Glufosinate-ammonium ™ (ammonium DL-homoaalnin-4-yl (methyl) phosphinate); Glyodin ™ (2-heptadecyl-2-imidazoline acetate); glyphosate isopropylamine salt (Glyphosate ™, isopropylamine salt of N-(phosphonomethyl)glycine); oxyfluorfen (Goal ™, 2-chloro-1-(3-ethoxy-4-nitrophenoxy)-4-(trifluoromethyl) benzene); cyphenothrin (Gokilaht ™, (RS)-alpha-cyano-3-phenoxybenzyl (1R)-cis, transchrysanthemate); metamitron (Goltix ™, 4-amino-3-methyl-6-phenyl-1,2,4-triazin-5 (4H)-one); Guazatine ™ (mixture of the raction products from polyamines, comprising mainly octamethylenediamene, iminodi (octaethylene) diamine and octamethylene bis); dimethipin (Harvade ™, (2,3-dihydro-5,6-dimethyl-1,4-dithiin 1,1,4,4-tetraoxide); norea (Herban ™, 3-(hexahydro-4,7-methanoindan-5-yl)-1,1-dimethylurea); Hexythiazox ™ (trans-5-(4-chlorphenyl)-N-cyclohexyl-4-methyl-2-oxothiazolidine-3-carboxamide); Hepteneophos (Hostaquick ™, 7-chlorobicyclo-(3.2.0)hepta-2,6-dien-6-yl dimethyl phosphate); Triazophos (Hostathion ™, (O,O-diethyl 0-1-henyl-1H-1,2,4-triazol-3-yl phosphorothioate); Amdro (Hydramethylnon ™, tetrahydro-5,5-dimethyl-2-(1H)-pyrimidinone (3-4-(trifluoromethyl)phenyl)-1-(2-(4-trifluoromethyl)phenyl) ethenyl)2-propenyl-idene) hydrazone); Imazalil ™ (1-(2-(2,4-dichlorophenyl)-2-(20propenyloxy) ethyl)-1H-imidazole); flutriafol (Imapact ™, (RS)-2,4'-difluoro-a-

(1H-1,2,4-triazol-1-yl methyl)benzhydryl alcohol); dihydropyrone (Indalone TM, butyl 3,4-dihyro-2,2-dimethyl-4-oxo-2H-pyran-6-carboxylate); butrizol (Indar TM, 4-n-butyl-4H-1,2,4-triazole); Ipazin TM; Isocarbamid TM; fenthiaprop-ethyl (Joker TM); Karate TM (alpha-cyano-3-phenoxybenzyl 3-(2-chloro-3,3,3-trifluoro-prop-1-enyl)-2,2-dimethylcyclopropanecarboxylate, a 1:1 mixture of the (Z)-(1R,3R) S-ester and (Z), (1S,3S), R-ester); Kasugamycin TM ((5-amino-2-methyl-6-(2,3,4,5,6-pentahydroxy cyclohexyloxy) tetrahydropropyran-3-yl) amino-alpha-iminoacetic acid); fluenethyl (Lambrol TM, 2-fluoroethyl (4-biphenyl)acetate); cloethocarb (Lance TM, 2-(2-chloro-1-methoxyethoxy)phenyl methylcarbamate); thiodicarb (Larvin Thiodicarb Insecticide/Ovicide TM, dimethyl N,N-(thiobis(methylimino)carbonyloxy-bis(ethanimidothioate)); Lenacil TM (3-Cyclohexyl-5,6-trimethyleneuracil); bensulfuron methyl (Londax TM, methyl 2-(((((4,6-dimethoxypyrimidin-2-yl)amino) carbonyl)amino)sulfony)methyl)benzoate); Lythidathion TM; maleic hydrazine (6-hydroxy-3(2H)pyridazinone); Midinoterb Acetate TM (2-tert-butyl-5-methyl-4,6-dinitrophenyl acetate); Menazon TM (S-(4,6-diamino-s-triazin-2-yl-methyl) O,O-dimethyl-phosphordithioate); aziprotyn (Mesoranil TM, 2-azido-4-isopropylamino-6-methylthio-s-triazine); oxydeprofos (Metasystox TM -S, S-(20 (ethylsulfinyl)-1-methylethyl-)O,O-dimethyl phosphorothioate); Methamidophos TM (0,S-dimethyl phosphoramidothioate); Methidathion TM (O,O-dimethyl phosphorodithioate, S-ester with 4-(mercaptomethyl)-2-methoxy-delta²-1,3,4-thiadiazolin-5-one); Methometon TM; Methomyl TM (S-methyl-N-((methylcarbamoyl)oxy)-thioacetimidate); Methoprene TM (isopropyl (2E-4E)-11-methoxy-3,7,11-trimethyl-2,4-dodecadienoate); Methoxychlor TM (2,2-bis (p-methoxyphenyl)-1,1,1-trichlorethane); Methyl Parathion TM (O,O-dimethyl-0,4-nitrophenyl phosphore-thioate); Methyldymron TM (1-(alpha,alpha-dimethylbenzyl)-3-methyl-3-phenyl urea); Metribuzin TM (4-amino-6(1,1-dimethylethyl)-3-(methylthio)-1,2,4-triazin-5(4H)-one); Mevinphos TM (alpha isomer of 2-carbomethoxy-1-methyl-vinyl dimethyl phosphate); dimethirimol (Milcurb TM, 5-n-Butyl-2-dimethylamino-4-hydroxy-6-methylpyrimidine); isazophos (Miral TM, 0-(5-chloro-1-(methylethyl)-1H 1,2,4-triazol-3-yl)O,O-diethyl prohphorothioate); pencyuron (Monceren TM, N-(4-chlorophenyl)methyl)-N-cyclopentyl-N'-phenylurea); flutolanil (Moncut TM, 3'-isopropoxy-2-(trifluoromethyl)benzanilide); oxythiquinox (Morestan TM, 6-methyl-1,3-dithiolo(4,5-b)quinoxalin-2-one); binapacryl (Morocide TM); Morphothion TM (O,O-dimethyl-S-(morpholinocarbonylmethyl)phophorodithioate); Naled TM (1,2-dibromo-2,2-dichloroethyl dimethyl phosphate); fosthietan (Nem-A-Tak TM); Nemamort TM (dichlorodiisopropyl ether); d-tetramethrin (Neo-Pynamin Forte TM, 3,4,5,6-tetrahydrophthalimidomethyl (1R)-cis, transchrysanthemate); NIA 10637 TM (ethyl hydrogen propyl phosphate); Nicotine TM (3-(1-methyl-2-pyrrolidyl) pyridine); bupirimate (Nimrod TM, 5-Butyl-2-ethylamino-6-methylpyrimidin-4-yl dimethylsulfamate); Norflurazon TM (4-chloro-5-(methylamino-2-(a,a,a-trifluoro-m-tolyl)-3(2H)-pyridazinone); Ortho-Dichlorobenzene (1,2-dichlorobenzene); Cyprazine (Outfox TM, 2-chloro-4-(cyclopropylamino)-6-(isopropylamino) s-triazine); Oxadiazon TM (2-tert-butyl-4-(2,4-dichloro-5-isopropoxyphenyl)-delta2-1,3,4-oxadiazolin-5-one); Oxamyl TM (methyl N',N'-dimethyl-N-(methylcarbomyl)oxy)-1-thiooxaminidate); isopropalin (Paarlan TM, 2,6-dinitro-N,N-dipropyl cumidine); Paclobutrazol TM ((2RS,3RD)-1-(4-chlorophenyl)-4,4-dimethyl-2-(1H-1,2,4-triazol-yl)pentan-3-ol); cartap (Padan TM, S,S'-(2-dimethylaminotrimethylene) bis(thio-carbamate) hydrochloride); nitrothal-isopropyl (Pallitop TM, 5-nitrobenzene-1,3-dicarboxylic acid-bis (1-methylethyl) ester); PDB (paradichlorobenzene TM, 1,4-dichlorobenzen TM); Paraoxon TM (O,O-diethyl-0-p-nitrophenyl phosphate); Parathion TM (O,O-diethyl 0-4-nitrophenyl phosphorothioate); parinol (Parnon TM, alpha, alpha-bis(p-chlorophenyl)-3-pyridinemethanol); Penconazole TM (1-(2-(2,4-dichlorophenyl)-n-pentyl)-1H-1,2,4-triazole); Permethrin TM ((3-pehnoxyphenyl)methyl(I)cis, trans-ethenyl-2,2-dimethylcyclopropane-carboxylate); nichlofos (Phosnichlor TM, 0-4-chloro-3-nitrophenyl O,O-dimethyl phosphorthioate); Phosphamidon TM (O,O-dimethyl 0-(2-chloro-2-diethylcarbamoyl)-1-methyl-vinyl) phosphate); Picloram TM (4-amino-3,5,6-trichloropicolinic acid); piperalin (Pipron TM, 3-(2-methylpiperidino)propyl 3,4-dichlorbenzoate); primicarb (Pirimor TM, 2-dimethylamino-5,6-dimethylpyrimidin-4-yl dimethylcarbamate); pindone (Pival TM, 2-pivalyl-1,3-indandione); nitralin (Planavin TM, 4-methylsulphonyl-2,6-dinitro-N,N-dipropylaniline); butoxycarboxim (Plant Pin TM, 3-(methylsulphonyl)-2-butanone-0-((methylamino)carbamyl)) oxime); benzethazet (Pifenate TM, 3,4-dichloro-2-(trichloromethyl) phenyl methyl acetate); Plyoxin D TM (5-((2-amino 5-0-(aminocarbonyl)-2-deoxy-L-xylonyl)amino)-1,5dideoxy-1-3,4-dihydro-5-(carboxy)-2,4-dioxo-1(2H-pyr imidinyl)-beta-D-allofuranuronic acid); prometon (Pramitol TM, 2,4-bis(isopropylamino)-6-methoxy-s-triazine); CGA-41065 (Prime+ TM, 2-chloro-N-(2,6-dinitro-4-(trifluoromethyl)-phenyl) N-ethyl-6-fluorobenzemethanamine); pirimiphos-ethyl (Primicid TM, 2-diethylamino-6-methyl-4-pyrimidinyl diethyl phosphorothioate); Prodiamine TM (N³,N³-Di-n-propyl-2,4-dinitro-6-(trifluoromethyl)-m-pyhrnylendiamine); Prometryn TM (2,4-bis(isopropylamino)-6-(methylthio)-s-triazine); Propargite TM (2-(4-(1,1-dimethylethyl) phenoxy)cyclohexyl)-2-propynyl sulfite); Propazine TM (2-chloro-4,6-bis(isopropylamino)-s-triazine); Prothion TM (O,O-diethyl S-carboxyethyl phosphorodiothioate); Prothoate TM (O,O-diethyl-S-(N-isopropylcarbanoylmethyl) phosphorodithioate); pendimethalin (Prowl TM, N-(1-ethylpropyl-3,4-dimethyl-2,6-dinitro-benzamine); AC 263,499 (Pursuit TM, (±) 2-(4,5-dihydro-4-methyl-4-(1-methylethyl)-5-oxo-1H-imidazol-2-yl)5-ethyl 3-pyridinecarboxylic acid); allethrin (Pynamin TM, (RS)-3-allyl-2-methyl-4-oxocyclopent-2-enyl (1RS)-cis/trans chrysanthemate); d-allethrin (Pynamin-Forte TM, (RS)-3-allyl-2-methyl-4-oxocyclopent-2-enyl (1R)-cis/trans chrysanthemate); chloridazon (Pyramin TM, 5-amino-4-chloro-2-phenyl-3-(2H)-pyridazione); Pyridate TM (0-(6-chloro-3-phenyl-4-pyrdazinyl)-S-oxtyl-carbonthioate); Pyrifenox TM (2',4'-dichloro-2-(3-pyridyl) acetopheonone)-methyloxinme; Pyroquilon TM (1,2,5,6-tetrahydro-4H-pyrrolo (3,2,1-i,j)quinolin-4-one); Quinalphos TM (O,O-diethyl 0-2-quinoxalinyl phosphorothioate); Quizalofop-ethyl TM (ethyl-2-(4-(6-chloroquinoxalin-2-yloxy) phenoxy)propionate); fthalide (Rabicide TM, 4,5,6,7-tetrachloropthalide); Coumatertralyl (Racumin TM, 4-hydroxy-3-(1,2,3,4-tetrahydro-1-naphtaleny)-2H-1-benzopyran-2-one); resmethrin (((5-(phenylmethyl)-3-furanyl) methyl 2,2-dimethyl-3-(2-methyl-1-propenyl) cyclopropanecarboxylate); Risalin TM (3,5-dinitro-N,N- di(npropyl) sulfanilamide); Ronnel ™ (0,0-dimethyl 0-(2,4,5-trichlorophenyl)-phosphorothioate); Rotenone ™; fenarimol (Rubigan ™, 3-(2-chlorophenyl)-3-(4-chlorophenyl)-5-pyrimidinemethanol); Dipropetryn (Sancap ™, 2-ethylthio-4,6-bis(isopropylaminol-s-triazine)); Imazaquin (Scepter ™ 2-(4,5-dihydro-4-methyl-4-(1-methylethyl)-5-oxo-1H-imidazol-2-yl))-3-quinoline carboxylic acid); Schradan ™ (octamethylpyrophosphoramide); desmetryn (Semeron ™, 2-isopropylamino-4-methylamino-6-methylthio-s-triazine); chlozolinate (Serinal ™, ethyl 3-(3,5-dichlorophenyl)-5-methyl-2,4-dioxo-5-carboxylate); Sethoxydim ™ (2(1-(ethoxyimino)butyl))-5-(2-(ethylthio)propyl)-3-hydroxy-2-cyclohexen-1-one); Siduron ™ (1-(2-methylcyclohexy)-3-phenylurea); Simazine ™ (2-chloro-4,6-bis(ethylamino)-s-triazine); Simetryn ™ (2,4-bis(ethylamino)-6-methylmercapto-S-triazine); Sindone ™ (1,1-dimethyl-4,6-diisopropyl-5-indanyl ethyl ketone); fenapanil (Sisthane ™, alpha-n-butyl-alphaphenyl-1H-imidazole-1-propane-nitrile); Solan ™ (3'-chloro-2- methyl-p-valertoluidide); tebuthiuron (Spike ™, N-(5-(1,1-dimethyl)-1,3,4-thiadiazol-2-yl)-N,N,-dimethylurea); flamprop-M-isopropyl (Suffix BW ™, isopropyl N-benzoyl-N-(3-chloro-4-fluorophenyl)-S-alanimate); Sulfometuron Methyl ™ (methyl 2((((4,6-dimethyl-2-pyrimidinyl)amino)carbonyl)amino)sulfonyl)) benzoate); bromobutide (Sumiherb ™, 2-bromo-N-(alpha, alpha-dimethylbenzyl)-3,3-dimethylbutyramide); procymidone (Sumilex ™, N-(3,5-dichlorophenyl)-1,2-dimethylcyclopropane-1,2-dicarboximide); d-phenothrin (Sumithrin ™, 3-phenoxybenzyl (1R)-cis/trans chrysanthemate); fluoroglycofen (Super Blazer ™, 2-ethoxy-2-oxo-ethyl 5-(2-chloro-4-(trifluormethyl)phenoxy)-2-nitrobenzoate); Oryzalin (Surflan ™, 3,5-dinitro-N,N-dipropylsulfanilamide); myclobutanil (Systhane ™, alpha-butyl-alpha-(4-chlorophenyl)-1H-1,2,4-triazole-1-propanenitrile); hymexazol (Tachigaren ™, 3-hydroxy-5-methylisoxaole); isomethiozin (Tantizon ™, 6-tert-butyl-4-isobutylidene amino-3-methylthio-1,2,4-triazin-5 (4H)-one); cyanthoate (Tartan ™, 0,0-diethyl S-N-(a-cyanoisopropyl) carbomylmethyl) phosphorothioate); aldicarb (Temik ™, 2-methyl-2-(methylthio) propionaldehyde 0-(methylcarbamoyl) oxime); Terbacil ™ (3-tert-butyl-5-chloro-6-methyluracil); Terbutryn ™ (2-tert butylamino-4-ethylamino-6-methylthio-s-triazine); tedion (Tetradifon ™, 4-chlorophenyl 2,4,5-trichlorophenyl sulfone); Tetramethrin ™ (3,4,5,6-tetrahydrophthalimidomethyl chrysanthenate); Thanite ™ (isobornyl thiocyanoacetate); Thiabendazole ™ (2-(4'-thiazolyl)-benzimidazole); Thiocyclam-Hydrogenoxalate ™ (N,N-dimethyl-1,2,3-trithian-5-amine-hydro-genoxalate); Thiophanate ™ (1,2-bis (3-ethoxycarbonyl-2-thioureido)-benzene); Thiophanate-methyl ™ (methyl((1,2-phenylene)bis-(iminocarbon-thioyl))bicarbamate); Thiram ™ (bis(dimethylthio-carbonyl)disulfide); propiconazole (Tilt ™, 1-(2-(2,4-dichlorophenyl)4-propyl-1,3-dioxolan-2-ylmethyl)-1H-1,2,4-triazole); prothiopos (Tokuthion ™, 0-(2,4-dichlorophenyl) 0-ethyl S-propyl phosphoro dithioate); Tomacon ™ (1-(2,4-dichlorophenoxyacetyl)-3,5-dimethyl-pyrazole); tetrafluoron (Tomilon ™, N,N-dimethyl-N,-(3-(1',1',2',2'-tetrafluoroethoxy)-phenyl)-urea); dialfor (Torak ™, S-(2-chloro-1-phthalimidoethyl) 0,0-diethyl phosphorodithioate); Tranid ™ (exo-3-chloro-endo-6-cyano-2-norbornanone 0-(methylcarbamoyl)oxime); Tribonate ™ (2,4-Dinitrophenyl 2-8(sec-butyl)-4,6-dinitrophenyl carbonate); methabenzthiazuron (Tribunil ™, N-2-benzothiazolyl-N,N'-dimethylurea); Trichlorfon ™ (dimethyl (2,2,2-trichloro-1-hydroxyethyl) phosphonate); Triclopyr ™ (3,5,6-trichloro-2-pyridinyloxyacetic acid); Tricyclazole ™ (5-methyl-1,2,4-triazolo(3,4-b)-benzothiazole); Trietazine ™ (2-chloro-4-diethylamino-6-ethylamino-1,3,5-triazine); Triflumizole ™ ((E)-4-chloro-alpha,alpha,alpha-trifluoro-N-(1-(imidazol-1-yl)-2-propoxyethylidene)-o-toluidine); Triforine ™ ((N,N'-1,4-piperazinediyl(2,2,2- trichloro-ethyl)idene-bis-(fromamide))); Nuarimol (Trimidal ™, alpha-(2-chlorophenyl)-alpha-(4-fluorophenyl)-5-pyrimidinemethanol); Uniconazole ™ ((E)-1-(4-chlorophenyl)-4,4-dimethyl-2-(1,2,4-triazol-l-yl)-1-penten-3-ol); Ethidimuron (Ustilan ™, N-(5-ethylsulphonyl)-1,3,4-thiadiazol-2-yl)-N,N'-dimethylurea); pyriminil (Vacor ™, 1-(3-pyridlmethyl)-3-(4-nitrophenyl)-urea); vernolate (Vernam ™, S-propyl dipropylthiocarbamate); dichlobutrazol (Vigil ™, (1-(2,4-dichlorophenyl)-4,4-dimethyl-2-(1,2,4-triazol-1-yl) pentan-3-ol)); Vinclozolin ™ (3-(3,5-dichlorophenyl)-5-vinyl-5-methyl-1,3-oxazolidine-2,4-dione); Zeatin ™; and thionazin (Zinophos ™, 0,0-diethyl 0-2-pyrazinyl phosphorothioate).

The following pesticides react slowly: acephate (O,S-dimethyl acetylphosphoramidothioate); Agribrom ™ (1-bromo-3-chloro-5,5-dimethyl-2,4-imidazolidine-dione); aldrin (1,4,4a,5,8,8a-hexahydro-1,4:5,8-dimethanonaphthalene); etacelasil (Alsol ™, 2-chloroethyl-tris(2'-methoxy-ethoxy)silane; amitrole (1H,1,2,4-trazol-3-amine); ammonium sulfamate; BHC ™ (1,2,3,4,5,6-hexachlorocyclohexane); Bulbosan ™ (1,3,5-trichloro-2,4,6-trinitrobenzene); Chlordane ™ (1,2,4,5 6,7,8,8-octachlor-2,3,3a,4,7,7a-hexahydro-4,7-methanoindane); Chloropicrin ™ (chloropicrin nitroirichloromethane); Chloropon ™ (2,2,3-trichloropropionic acid); Dibromochlorpropane ™ (1,2-dibromo-3-chloropropane); DCU (Dichloralurea ™, 1,3-bis (2,2,2-trichloro-1-hydroxyethyl) urea); Dieldrin ™ (1R,4S,4aS, 5R,6R,7S,8S,8aR)-1,2,3,4,10,10-hexachloro-1,4,4a,5,6,7,8a-octahy dro-6,7-epoxy-1,4,5,8-dime thanonaphthalene); DuNema ™ (4-chloropyridine-N-oxide); Endosulfan ™ (6,7,8,9,10,10-hexachloro-1,5,5a,6,9,9a-hexahydro-6,9-methano-2,4,3-benzodioxanthiepin-3-oxide); Endrin ™; ethylene dibromide (1,2-dibromoethane); EDC (ethylene dichloride, 1,2-dichloroethane); tefluthrin (Force ™, 1.5% tefluthrin+98.5% inert ingredients); Gamma-HCH ™ (gamma-1,2,3,4,5,6-hexachlorocyclohexane); Heptachlor ™ (1,4,5,6,7,8,8-heptachloro-3a,4,7,7a-tetrahydro-4,7-methanoindene); hexachloroacetone (hexachloro-2-propanone): Hexazinone ™ (3-cyclohexyl-6-(dimethylamino)-1-methyl-1,3,5-triazine-2,4-(1H,3H)-dione); aldrin (HHDN ™, 1,2, 3,4,10.10-hexachloro-1,4,4a,5,8,8a5,8,8a-hexahydro-1,4-endo,exo-5,8-dimethanonapthalene); chlordecone (Kepone ™, decachlorooctahydro-1,3,4-metheno-2H-cyclobuta (ed) pentalen-2-one); chlorquinox (Lucel ™, 5,6,7,8-tetraxhloroquinoxaline); Mazidox ™ (azido-bis (dimethylamino)phosphine oxide); MGK 264 ™ (N-(2-ethylhexyl)-5-norbornene-2,3-dicarboximide); Mirex ™ (dodecachloroctahydro-1,3,4-methyleno-2H-cyclobuta(cd)pentalene); Molinate ™ (S-ethyl hexahydro-1. H-azepine-1-carbothioate); Mucochloric Anhydride ™ (bis(3,4-dichloro-2(5)furanonyl ether); Nabam ™ (disodium ethylene-1,2-bisdithiocarbamate); Niacide ™ (manganous dimethyl dithiocarbamate); Nonachlor ™ (1,2,3,4,5,6,7,8,8,-nonchloro-3a,4,7 7a-tetrahydro-4,7-methanoindan); Paraquat ™ (1,1'- dimethyl-4,4'-bipyridinium ion); PCNB ™ (pentachloronitrobenzene); ethylan (Perthane ™, 1,1-dichloro-2,2-bis(4-ethylphenyl) ethane); mepiquat-chloride (Pix ™, 1,1-dimethylpiperidiniumchloride); Propineb ™ ((((1-methyl-1,2-ethanediyl)bis(carbanodithioato))(2-))zinc homopolymer); sodium fluoroacetate (sodium monofluoracetate); ethalfluralin (Sonalan ™, N-ethyl-N-(2-methyl-2-propenyl)-2,6-dinitro-4(trifluomethyl) benzanamine); TCA ™ (trichloroacetic acid); TDE ™ (1,1-dichloro-2,2-bis(p-chlorophenyl) ethane); Teflubenzuron ™ (1-(3,5-dichloro-2,4-difluorophenyl)-3-(2,6-difluorobenzyl)-urea); isobenzan (Telodrin ™, isobornyl thiocyanoacetate); profluralin (Tolban ™); Trifluralin ™ (alpha, alpha, alpha-trifluoro-2,6-dinitro N,N-dipropyl-p-toluidine); trihydroxytriazine (2,4,6-Trihydroxy-1,3,5-triazine); and monuron TCA (Urox ™).

Preferred degradation reaction mixtures contain between a trace to about 1 mM pesticide, though the amount of pesticide present is not critical. An advantage of the present invention is that a wide range of pesticide concentrations can be degraded by the ferric reagents of this invention.

The degradation reaction is generally carried out in an acidic aqueous solution at room temperature (i.e., about 18° to about 22° C.) in the presence of air and preferably in the presence of light. Bright light is preferred over dim light. The pH of the reaction mixture preferably varies between about 1.5 to about 3.5, more preferably about 2.5 to about 3.0. Under these conditions, complete pesticide mineralization, i.e, complete conversion of organic material to inorganic, can take place in less than two hours with peroxide to pesticide ratios as low as 5.

An advantage of the present invention is that degradation, and, eventually, mineralization, of toxic pesticides can be achieved under mild conditions using relatively inexpensive reagents and no special equipment. Using dilute reagents, for example, herbicides such as 2,4-dichlorophenoxyacetic acid and 2,4,5-trichlorophenoxyacetic acid can be completely dechlorinated in a fraction of an hour and completely mineralized in under two hours. (Specific conditions are set out in the next section.) It is an advantage of the invention that the method can be used both to destroy waste pesticides and to decontaminate equipment. The invention is especially suited to small to medium scale pesticide waste generation such as container and machinery rinsates and removal of unused formulations.

EXAMPLES

The following examples are presented to further illustrate and explain the present invention and should not be taken as limiting in any regard. Unless otherwise indicated, all parts and percentages are by weight, and are based on the weight at the particular stage of the processing being described

Example 1

This example illustrates the degradation of the herbicide 2,4-dichlorophenoxyacetic acid (herein abbreviated 2,4-D) with an aqueous acidic ferric reagent containing hydrogen peroxide of this invention.

Analyses 2,4-Dichlorophenoxyacetic acid is analyzed by high performance liquid chromatography (HPLC) on a 5-micron Spherisorb ODS-2 C-18 reverse-phase 25 cm column (Alltech) using ultraviolet detection at 230 nm. Samples (2 ml) are quenched in methanol containing 0.13% trifluoroacetic acid (3 ml) prior to chromatography. The mobile phase is methanol-water-trifluoroacetic acid in a ratio of 60:40:0.08 (v/v/v). At a flow rate of 1.5 ml/min, the elution time is about 7.8 minutes. Standards of the 2,4-dichlorophenoxy acid (Aldrich, $\geq$98% pure) are prepared in 60:40 (v/v) methanol-water.

Hydrogen peroxide is determined iodimetrically. To prevent interference from $Fe^{+3}$, titrations are carried out in the presence of NaF (100:1 Fe/F molar ratio).

Chloride is measured with a chloride-selective electrode (Orion model 96-17B). Calibration curves are generated from NaCl standard solutions containing all components of the reaction mixture except the herbicide and peroxide. Prior to analysis, 5 ml aliquots of sample or standard solutions are treated with 0.5 ml 1M $NaHCO_3$ (as buffer), 0.1 ml Orion ISA reagent, and 0.05 ml methanol to quench the herbicide degradation reaction. Measurements are made within one hour after quenching.

Carbon-14 is measured by liquid scintillation counting in 15 ml Opti-Fluor (Packard Instrument Co.) using the external standard method. Quench curves are constructed with $CCL_4$. One-ml of reaction mixtures containing $^{14}C$-labelled compound is added to 1 ml water plus 0.5 ml methanol in a scintillation vial and purged with a stream of argon for 2 minutes to drive off $^{14}CO_2$ before addition of the scintillation cocktail.

For $^{14}CO_2$ gas evolution measurements, glass wool impregnated with 0.3 ml of 1M aqueous ethanolamine is employed as a $CO_2$ trap in a well in the stopper of the reaction flask (1M NaOH works equally well, but the resulting $Na_2^{14}CO_3$ is insoluble in Opti-Fluor). The stopper well and its contents (including the glass wool) are added to a separate scintillation vial after first separating the glass wool from the well with a forceps. In these cases, controls show the mass transfer of $^{14}CO_2$ from solution to well is complete within an hour.

Reagents

Stock solutions of ferric salts are made fresh (within 1 h) before use in 0.1 or 0.01M of the appropriate mineral acid. $Fe(ClO_4)_3$ (GFS Chemicals, Columbus, Ohio) in $HClO_4$ is generally employed. Stock solutions of 2,4-D herbicide (about 0.03 to 0.14M) are prepared by converting the acid form to the sodium salt With NaOH to a final pH of 6 to 7. Ring-UL-$^{14}C$-2,4-dichlorophenoxyacetic acid (10 mCi/mmol) and carboxy-$^{14}C$-2,4-dichlorophenoxyacetic acid (9.0 mCi/mmol) are used as received (>98% pure) from Sigma Chem. Co. Hydrogen peroxide (30%, Fisher) is assayed periodically and, if necessary, a diluted stock is made just prior to use.

Nonphotolytic Degradation

Experiments are conducted in a thermostated room at 21°±1° C. or in a water bath at 21°±0.2 C. A typical experiment involves preparing a solution (usually 100 ml in a 250-ml Erlenmeyer flask equipped with a magnetic stir bar) containing herbicide, background electrolytes, and the iron stock solution, which lowers the pH to about 3. If the target pH is below 3, the pH is adjusted with concentrated acid (usually $HClO_4$) If the target pH is higher than 3, NaOH is added, and the solution is allowed to stand for 15 minutes. A magnetic stirrer is then turned up to sufficient speed to create a profusion of bubbles to maintain oxygen saturation, and the reaction is initiated by adding hydrogen peroxide.

Reactions where $^{14}CO_2$ evolution is monitored are carried out on a 10-ml scale in 50 ml Erlenmeyer flasks. The flasks are fitted with a stopper holding a polypropylene center well (Kontes) which contains a plug of glass wool impregnated with ethanolamine as described above. The flasks are placed on a revolving shaker at 100 revolutions per minute.

Figure 2:
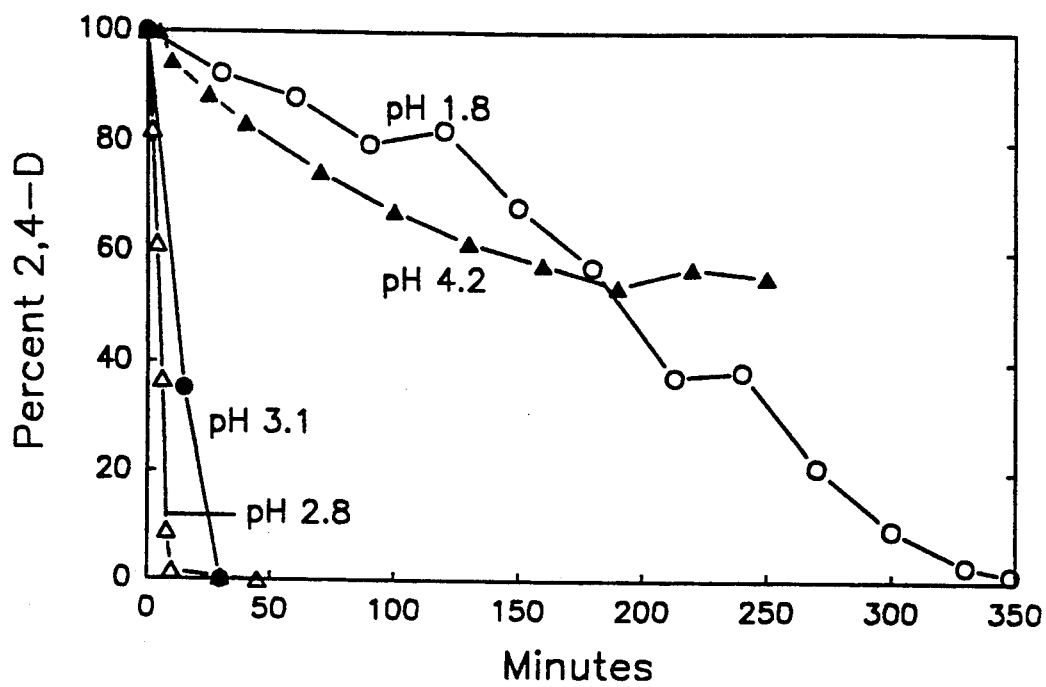
Figure 3:
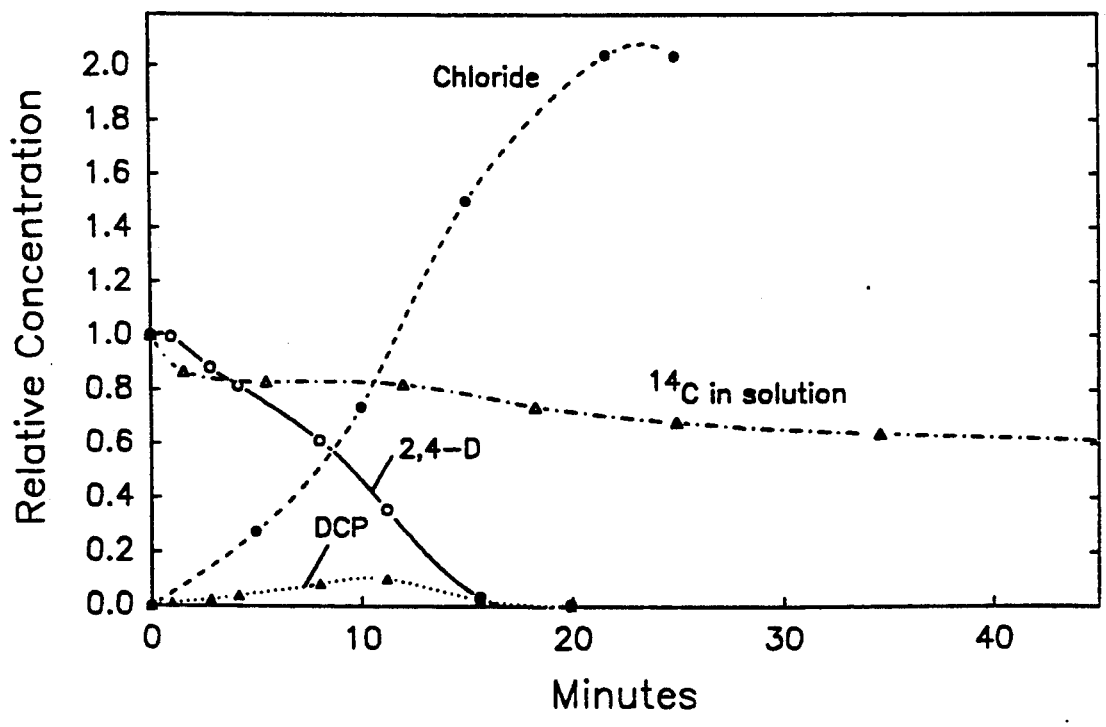
FIG. 3 shows the ferric reagent mineralization of ring-uniformly labelled(UL)-$^{14}$C-2,4-dichlorophenoxyacetic acid at a pH of 2.8 as described in Example 1. The reaction mixture contains 0.2 mM ($1 \times 10^4$ disintegrations per minute (DPM)/ml) herbicide, 1.0 mM ferric ion, 10 mM peroxide and 0.2M sodium perchlorate. DCP is 2,4-dichlorophenol.

The results are plotted in FIGS. 1 to 6. Dichlorophenol (herein abbreviated DCP) is a transient intermediate in the reaction (FIGS. 1 to 3). The production and disappearance of DCP parallel the reactivity of the parent compound (FIGS. 1 and 2); thus, DCP peaks early under conditions where 2,4-D degradation is fast (e.g., at pH 2.7), but correspondingly later under conditions where 2,4-D degradation is slow.

At optimum pH, chloride is released rapidly and quantitatively (FIG. 3). Dechlorination is practically concomitant with loss of parent material. Chlorine present in the species 2,4-D, DCP, and $Cl^-$ accounts for between 90 and 100% of total chlorine throughout the reaction. Extraction of the reaction mixture with organic solvents at various times during treatment of ring-labelled 2,4-D with $Fe^{+3}/H_2O_2$ indicates that 2,4-D is rapidly converted to highly hydrophilic intermediates; for instance, the percent of ethyl-acetate extractable radioactivity declined from 100% at time zero to <1% after dechlorination was achieved (i.e., after about 40 minutes).

$Fe^{+3}/H_2O_2$ treatment of the herbicide at optimum pH also results in substantial mineralization of herbicide carbon. Evolution of $^{14}CO_2$ from labelled compounds in reactions carried out in the dark cease after 3 to 4 hours. By this time most of the hydrogen peroxide has decomposed. Table I summarizes the extent of mineralization as a function of herbicide and reagent concentrations at pH 2.7 to 2.8 in perchlorate solution:

TABLE I

Mineralization of Herbicides by $Fe^{3+}/H_2O_2$
(Dark, pH 2.7-2.8, 0.2 M Sodium Perchlorate)

| labelled compound, mM | mM $H_2O_2$ | mM $Fe^{3+}$ | % initial $^{14}C^a$ remaining in soln | $^{14}CO_2$ |
|---|---|---|---|---|
| ring-2,4-D | 0.1 | 0 | 1 | 100 | 0 |
| " | 0.1 | 10 | 1 | 53 | 45 |
| " | 0.1 | 100 | 1 | 39 | 56 |
| " | 0.1 | 500 | 1 | 27 | 69 |
| " | 0.1 | 10 | 0.2 | 56 | NA[b] |
| " | 0.1 | 10 | 1 | 58 | NA |
| " | 0.1 | 10 | 5 | 52 | NA |
| " | 0.1 | 10 | 20 | 57 | NA |
| " | 0.1 | 100 | 1 | 40 | NA |
| " | 0.5 | 100 | 1 | 40 | NA |
| carboxy-2,4-D | 0.1 | 10 | 1 | 66 | 37 |
| ring 2,4,5-T[c] | 0.1 | 10 | 1 | 59 | 41 |

[a] After 3-4 h reaction time.
[b] Not analyzed.
[c] Example 2

FIG. 1 shows the sensitivity of the reaction to pH. The rate is maximum around pH 2.7 to 2.8 and falls off steeply on either side of the maximum. At optimum pH, herbicide disappears in under 30 minutes at hydrogen peroxide concentrations of 2.5 to 10 mM (FIGS. 1 to 3).

Increasing the hydrogen peroxide concentration from 10 to 500 mM results in significant improvements in 2,4-D mineralization (Table I). Increasing ferric ion, on the other hand, has essentially no effect. At two higher ferric concentrations (5 and 20 mM), the reaction solution immediately turns a persistent deep red color characteristic of soluble polynuclear ferric oxyhydroxides, even in the absence of 2,4-D and hydrogen peroxide Determination of the influence of herbicide concentration on mineralization is hampered by its limited solubility in acid form. However, no significant difference in mineralization is seen between 0.1 and 0.5 mM 2,4-D at constant ferric and hydrogen peroxide concentrations (Table I). Consistent with this, the reaction may be approximated as zero-order in 2,4-D concentration (i.e., linear with time) near the optimum pH (FIGS. 1 to 3), although more complex kinetics are found at other pHs.

The transformation of 2,4-D by $Fe^{+3}/H_2O_2$ is sensitive to the anion originating from the ferric salt or acid counterions and background electrolytes. $Fe^{+3}/H_2O_2$ exhibits lower reactivity in chloride or sulfate solutions compared to perchlorate or nitrate solutions (Table II). The pseudo zero-order rate constants at constant ionic strength (Na salts) follow the order:

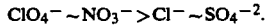

$$ClO_4^- \sim NO_3^- > Cl^- \sim SO_4^{-2}.$$

Also, the peak yield of DCP in the presence of chloride is considerably higher compared to other anions (Table II).

Figure 4:
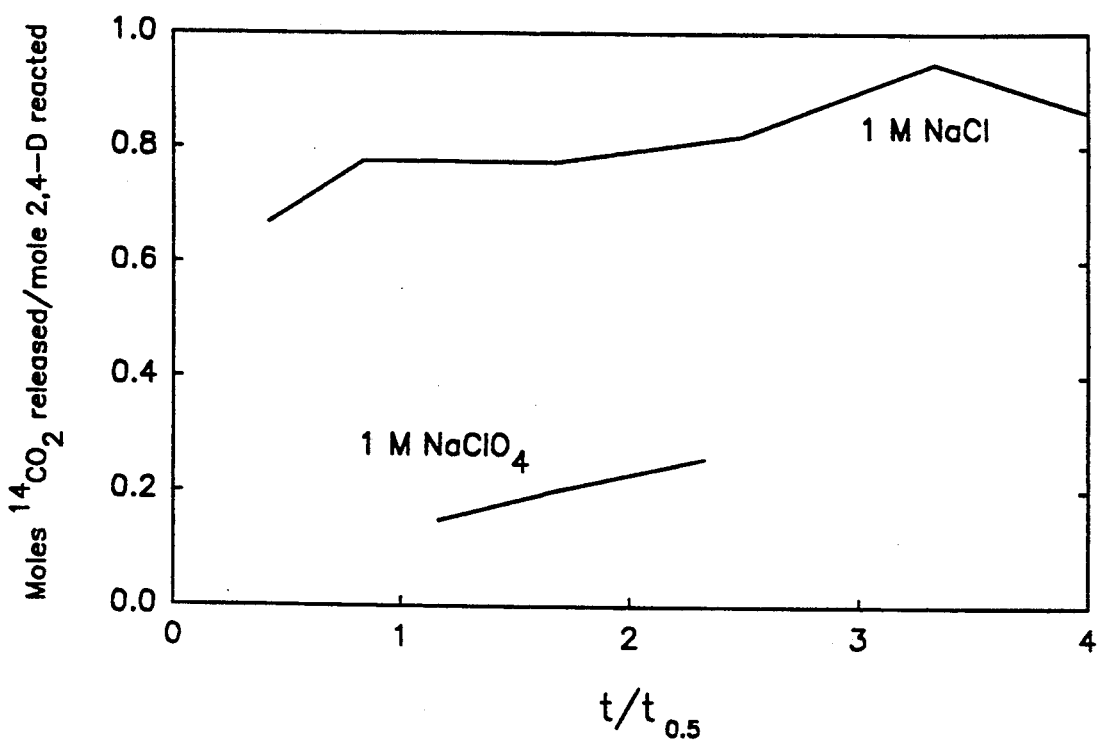
FIG. 4 shows the comparative yields of $^{14}CO_2$ from carboxy-$^{14}$C-2,4-dichlorophenoxyacetic acid in chloride and in perchlorate reaction media at pH 2.75 as set out in Example 1. The mixtures are 0.1 mM ($1 \times 10^4$ DPM/ml) in herbicide, 1.0 mM in iron, and 10 mM in peroxide.
Figure 5:
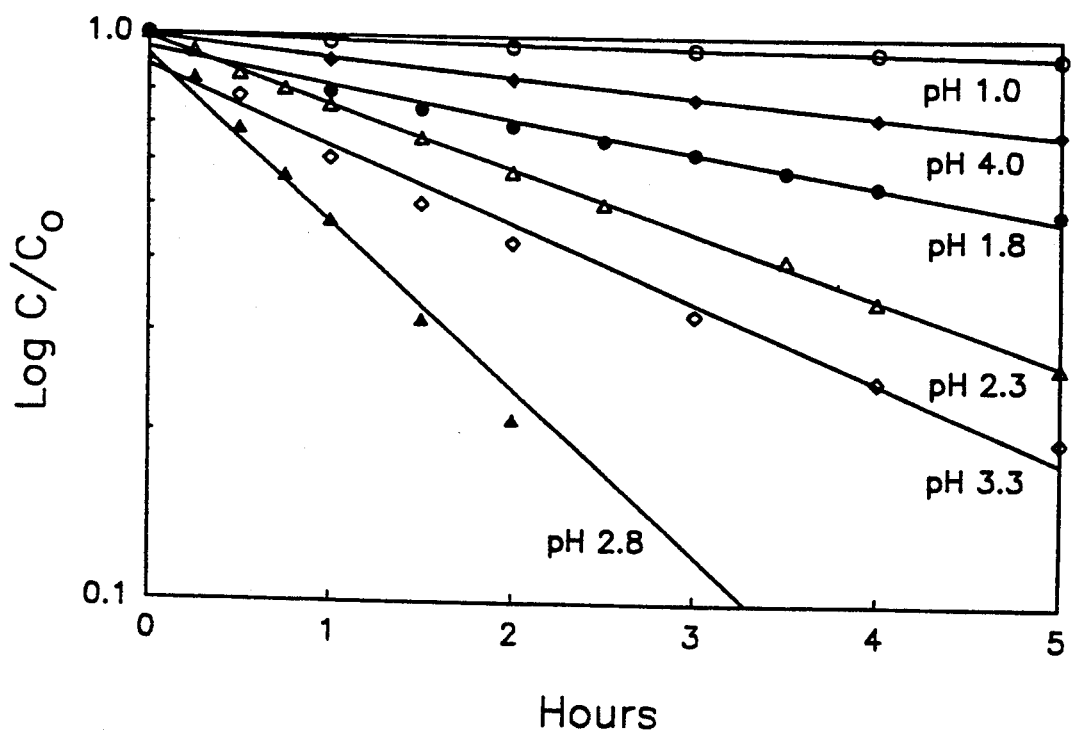
Figure 6:
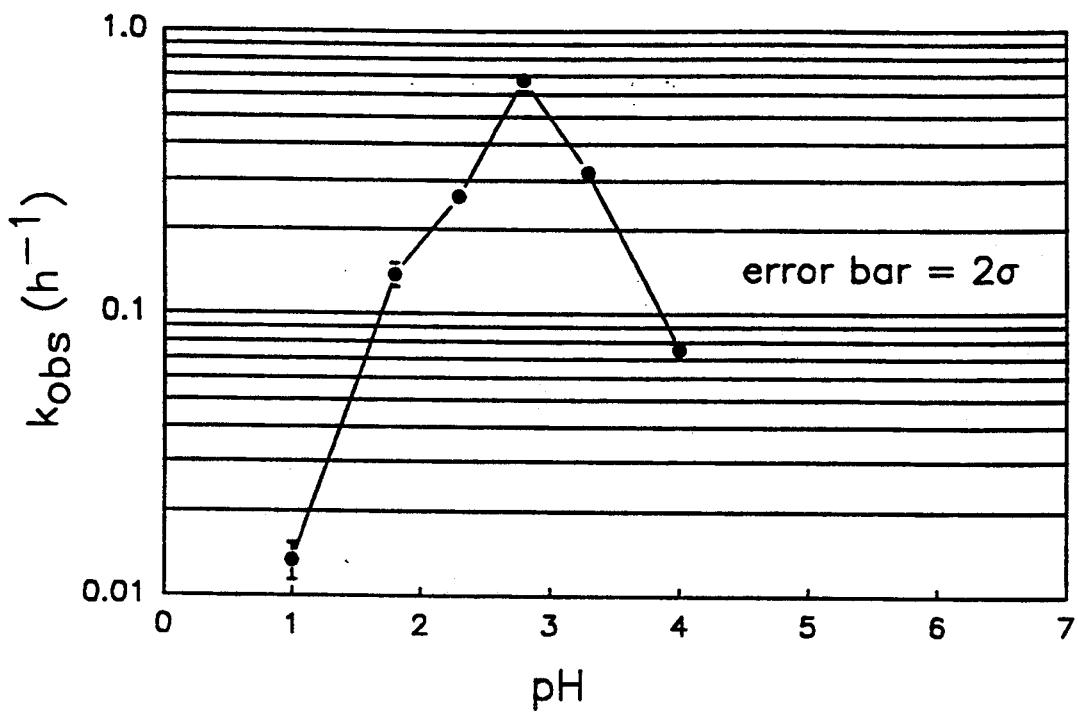

In chloride solution, the ratio of moles of $^{14}CO_2$ produced per mole of carboxy-$^{14}C$-2,4-D reacted is much greater than it is in perchlorate solution (FIG. 4). In perchlorate solution, mineralization of the carboxyl carbon of 2,4-D is slightly less extensive than ring carbons. Taken together with the higher yield of DCP in chloride compared to ther anions (Table II) indicates that the mechanism of herbicide decomposition varies with anion. As little as 1000 mg/L (31 mM) methanol stops the reaction.

Controls show that hydrogen peroxide is decomposed by ferric ion in the absence of herbicide. The pseudo first-order rate constant, $k_{obs}$, at a ferric concentration of 0.99 mM shows a pH profile (FIGS. 5 and 6) which is virtually identical to that of the 2,4-D transformation (FIG. 1). The $Fe^{+3}$-catalyzed decomposition of hydrogen peroxide is also sensitive to the anion (Table II); the pseudo first-order rate constants measured in the absence of 2,4-D follow the order:

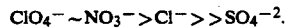

$$ClO_4^- \sim NO_3^- > Cl^- >> SO_4^{-2}.$$

TABLE II

Influence of Anion on Ferric Iron Reactivity
(1.0 mM $Fe^{+3}$, pH 2.7-2.8)

| M | electrolyte | 2,4-D transformation pseudo zero-order k, $10^{-4}$ M/h ($\pm$2SE)[a] | DCP max. yield, % | $H_2O_2$ decomposition pseudo $1^{st}$ or $k_{obs}$, $h^{-1}$ ($\pm$2SE)[b] |
|---|---|---|---|---|
| 1 | $NaClO_4$ | 3.3(0.3); | 9.7 | 0.67(0.04) |

TABLE II-continued

Influence of Anion on Ferric Iron Reactivity
(1.0 mM $Fe^{+3}$, pH 2.7-2.8)

| M | electrolyte | 2,4-D transformation pseudo zero-order k, $10^{-4}$ M/h (±2SE)[a] | DCP max. yield, % | $H_2O_2$ decomposition pseudo 1st or $k_{obs}$, $h^{-1}$ (±2SE)[b] |
|---|---|---|---|---|
| 1 | $NaNO_3$ | 4.3(0.4)[c]<br>3.6(0.6) | 8.9 | 0.56(0.02);<br>0.49(0.04)[c] |
| 1 | NaCl | 0.39(0.09);<br>0.36(0.05)[c] | ≧43;<br>25[c] | 0.31(0.01) |
| 1 | $Na_2SO_4$ | 0.36(0.04) | 13 | 0.033(0.001) |
| 0.1 | $NaClO_4$ | 3.5(0.8) | 11 | — |
| 0.1 | NaCl | 0.65(0.13) | 28 | — |
| 0.1 | $Na_2SO_4$ | 0.57(0.09) | 14 | — |

[a] $[H_2O_2]_i$ = 10 mM; range $r^2$ for C vs t, 0.963-0.996, n = 5-7; SE is standard error of slope.
[b] Range $r^2$ for ln $C/C_o$ vs t, 0.991-0.998, n = 9-11.
[c] Duplicate run.

Photolytic Degradation

Reactions are carried out in 250-ml Pyrex Erlenmeyer flasks equipped with a magnetic stir bar and covered with a 38 mm diameter watchglass. The flasks are stirred magnetically. Samples under "bright" conditions are irradiated about 30 cm from a rack of four 244-cm long 200 W "cool white" fluorescent lights. Samples under "dim" light conditions are placed more remote from the source and received a combination of direct light and light reflected off the white walls of the room.

The radiant intensity in the visible region (400 to 700 nm) is measured with a Li-Cor Quantum Radiometer (Model LI-185B) while that in the near UV region (290 to 385 nm) is measured with an Eppley UV radiometer (No. 23520) covered with a Pyrex beaker. Dark controls are carried out concurrently in aluminum foil-covered flasks.

Figure 7:
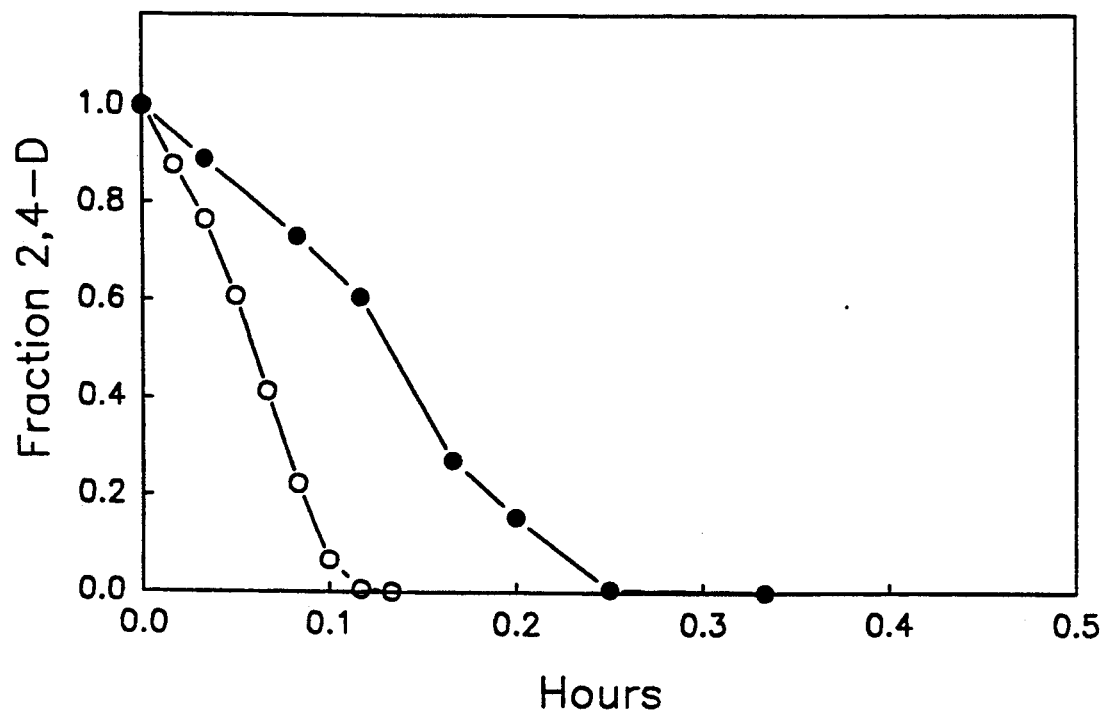
FIGS. 7 and 8 show the photo-assisted ferric reagent degradation of ring-labelled 2,4-dichlorophenoxyacetic acid at pH 2.7 using the method of Example 1. The reaction is 0.1 mM ($1 \times 10^4$ DPM/ml) in labelled herbicide, 1.0 mM in ferric perchlorate, 10 mM in peroxide, and 0.2M in sodium perchlorate. Iron and hydrogen peroxide are present in the reactions plotted in FIG. 7, with 'a' being bright light and 'b', the dark reaction.
Figure 7A:
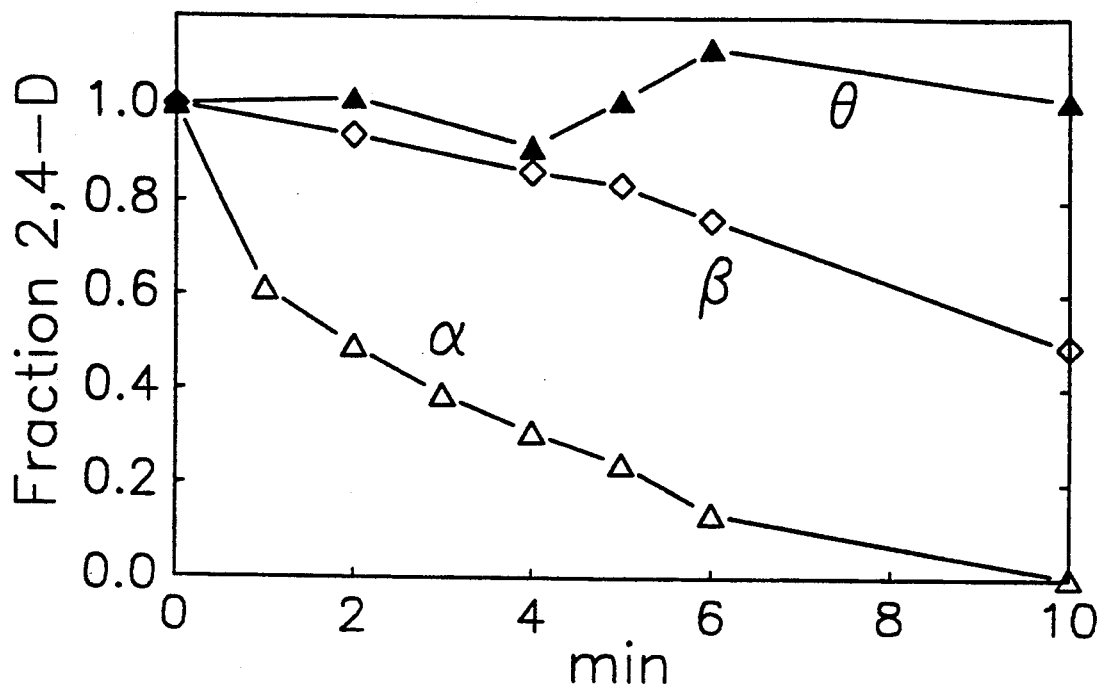
Figure 8:
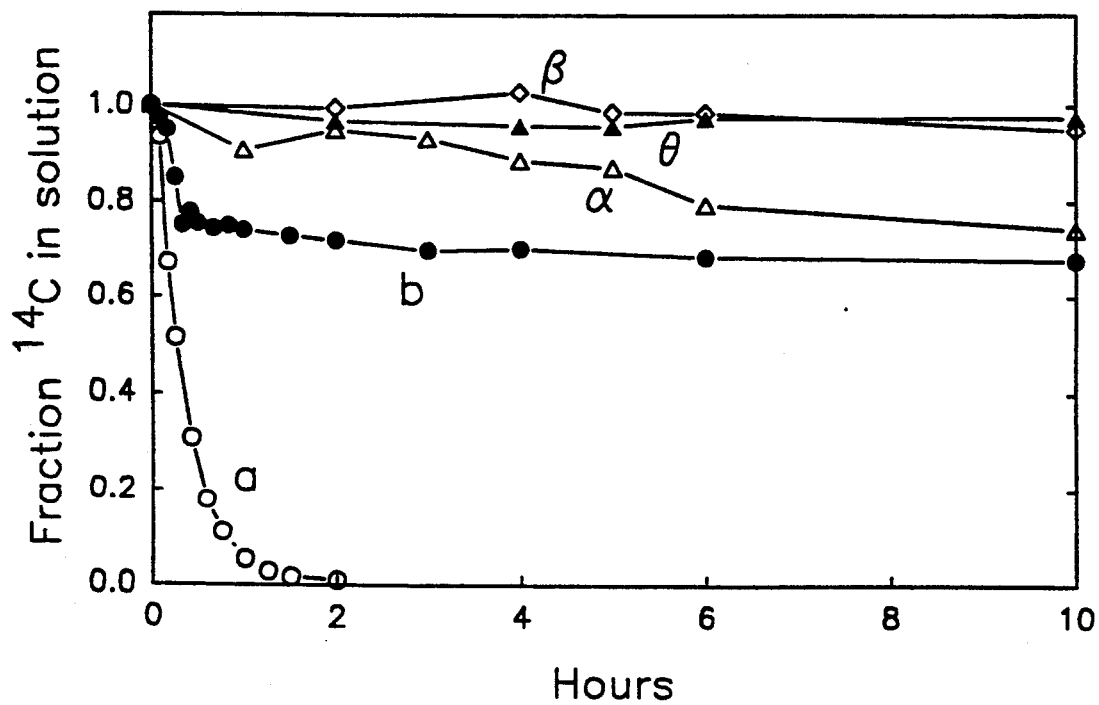

FIGS. 7 and 8 shows that the transformation and mineralization of the herbicide in the presence of $Fe^{+3}/H_2O_2$ is strongly accelerated by irradiation from a conventional fluorescent light. Samples under "bright" light received 0.034 to 0.036 $mW/cm^2$ in the near UV (290 to 385 nm) and 1.2 to 1.3 $mW/cm^2$ in the visible region (400 to 700 nm). Under these conditions, transformation of the herbicide in the presence of 1.0 mM $Fe^{+3}$ and 10 mM $H_2O_2$ is complete in less than 0.15 hours and mineralization of ring-labelled 2,4-D is complete in less than two hours. Using initial rates, transformation of 2,4-D under bright light is 2.7 times faster than in the dark.

Figure 9:
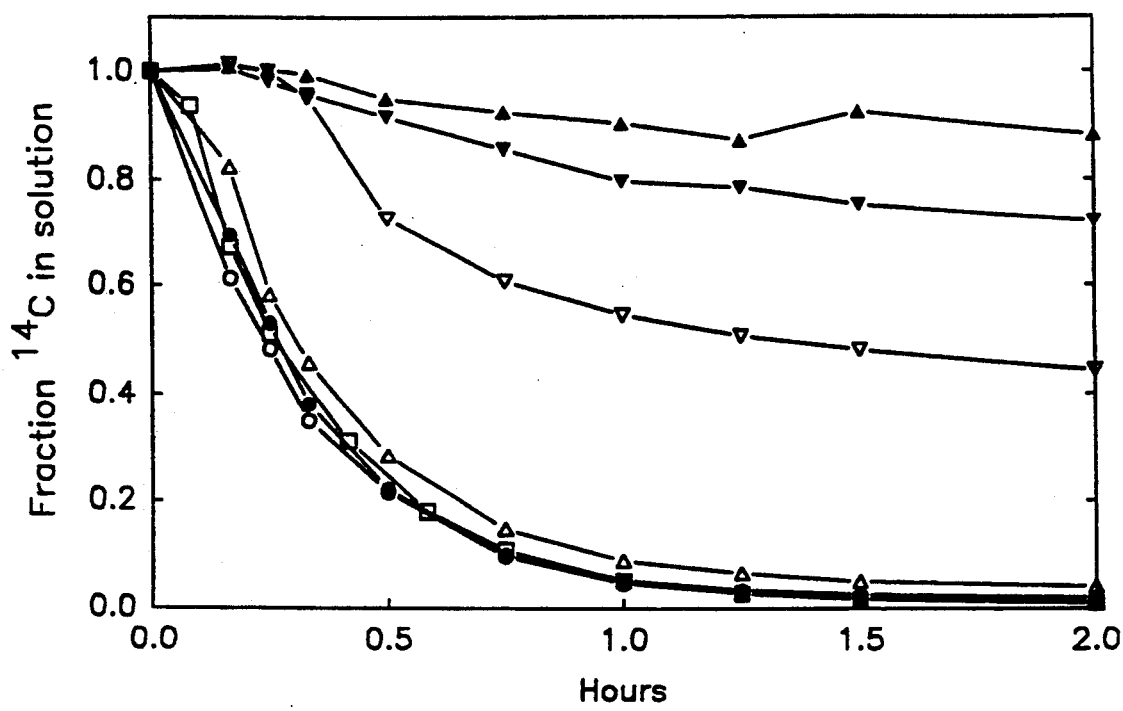
FIG. 9 shows the photo-assisted ferric reagent mineralization of ring-labelled 2,4-dichlorophenoxyacetic acid as a function of peroxide concentration in bright light as described in Example 1. Peroxide concentrations vary as follows: ▲—▲ 0.1 mM, ▼—▼ 0.2 mM, ∇—∇ 0.4 mM, △—△ 0.5 mM, ●—● 2 mM, ○—○ 5 mM, and □—□ 10 mM. Other conditions are as set out for FIGS. 7 and 8 above.

Bright light iron-only and peroxide-only controls show degradation, but on a much longer time scale (inset, to FIG. 7). Iron-only controls show slow loss of parent herbicide and 25 to 30% mineralization over a 10-hour period. Peroxide-only controls show little or no parent herbicide transformation or mineralization. Dark iron-only controls also give no reaction. Hydrogen peroxide decomposition is accelerated under bright light, showing a pseudo first-order rate constant 1.35 times greater than that of the dark reaction at 1 mM iron and 100 mM peroxide The effect of hydrogen peroxide concentration on bright photo-assisted mineralization of ring-labelled 2,4-D at constant iron concentrations of 1 mM is shown in FIG. 9. Reactions carried out at 0.5, 2.0, 5.0, and 10 mM $H_2O_2$ are almost indistinguishable, whereas 0.1 mM $H_2O_2$ is ineffectual, and 0.2 and 0.4 mM are intermediate.

Example 2

This example illustrates the degradation of another herbicide, 2,4,5-trichlorochlorophenoxyacetic acid (herein abbreviated 2,4,5-T), with an aqueous acidic ferric reagent containing hydrogen peroxide of this invention.

The procedures and reagents described in Example 1, above, are employed, except that the methanol-water-trifluoroacetic acid proportions in the HPLC mobile phase is 70:30:0.064 (v/v/v); at a flow rate of 1.5 ml/min, the elution time is about 7.2 minutes. Ring-UL-$^{14}$C-2,4,5-T was obtained from Sigma and used as received (>98% pure).

Figure 10:
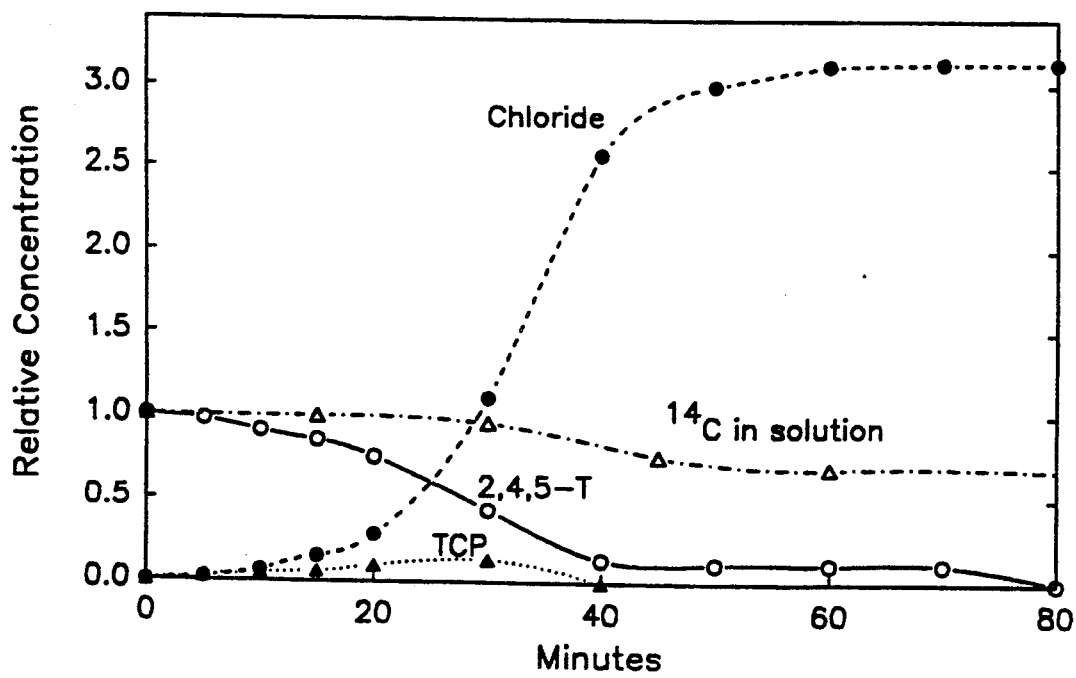
FIG. 10 shows the ferric reagent mineralization of ring-labelled 2,4,5-trichlorophenoxyacetic acid at pH 2.75. Initial concentrations are 0.175 mM ($1 \times 10^4$ DPM/ml) in labelled herbicide, 1.0 mM in ferric ion, 10.2 mM in peroxide, and 0.2M in sodium perchlorate.
Figure 11:
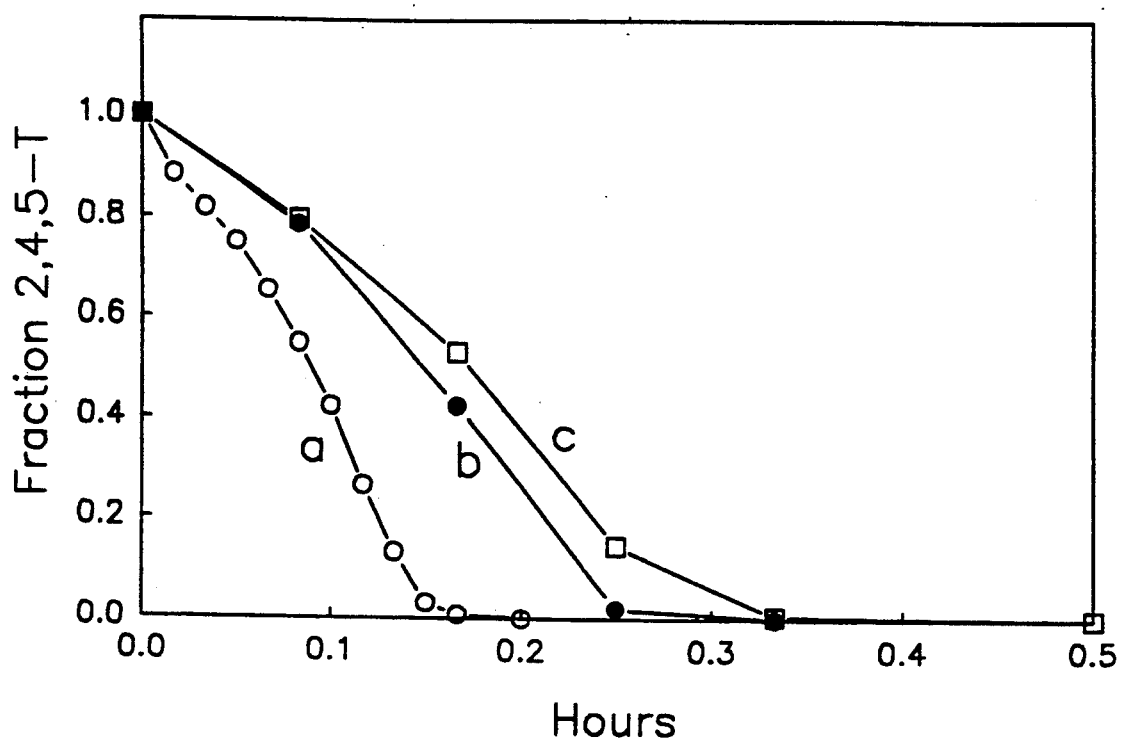
FIGS. 11 and 12 show the photo-assisted ferric reagent degradation of ring-labelled 2,4,5-trichlorophenoxyacetic acid at pH 2.7 using the method of Example 2. The reaction is 0.1 mM in labelled herbicide, 1.0 mM in ferric perchlorate, 10 mM in peroxide, and 0.2M in sodium perchlorate. Reactions 'a', 'b', and 'c' all have iron and peroxide present; 'a' is carried in the presence of bright light, 'b', in the dark, and 'c', in dim light. Alpha denotes a reaction carried out in bright light with iron alone, beta, bright light and peroxide alone, and theta is dark with iron alone.
Figure 11A:
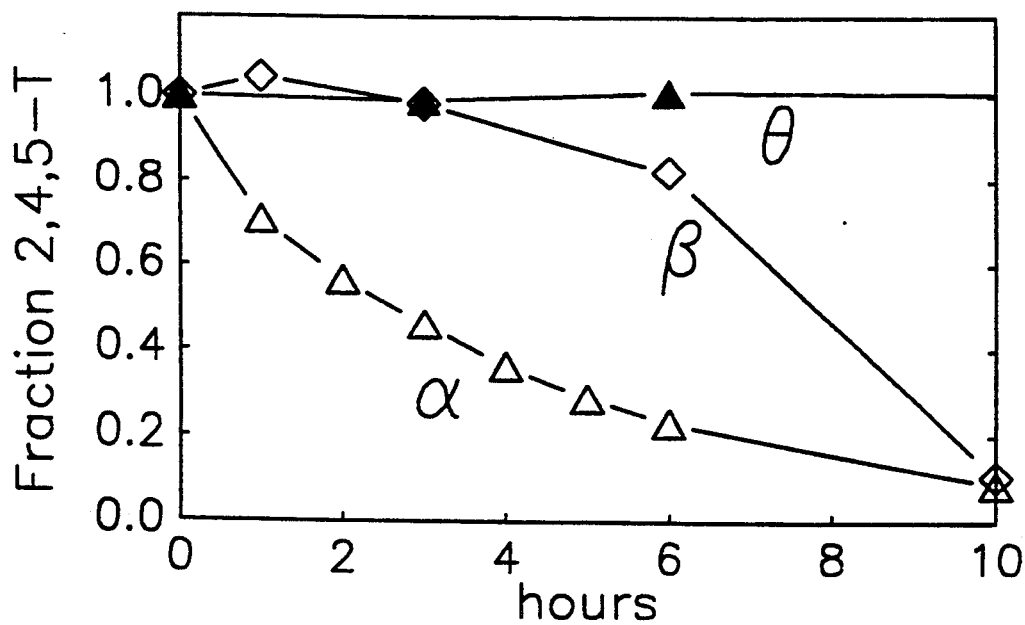
Figure 12:
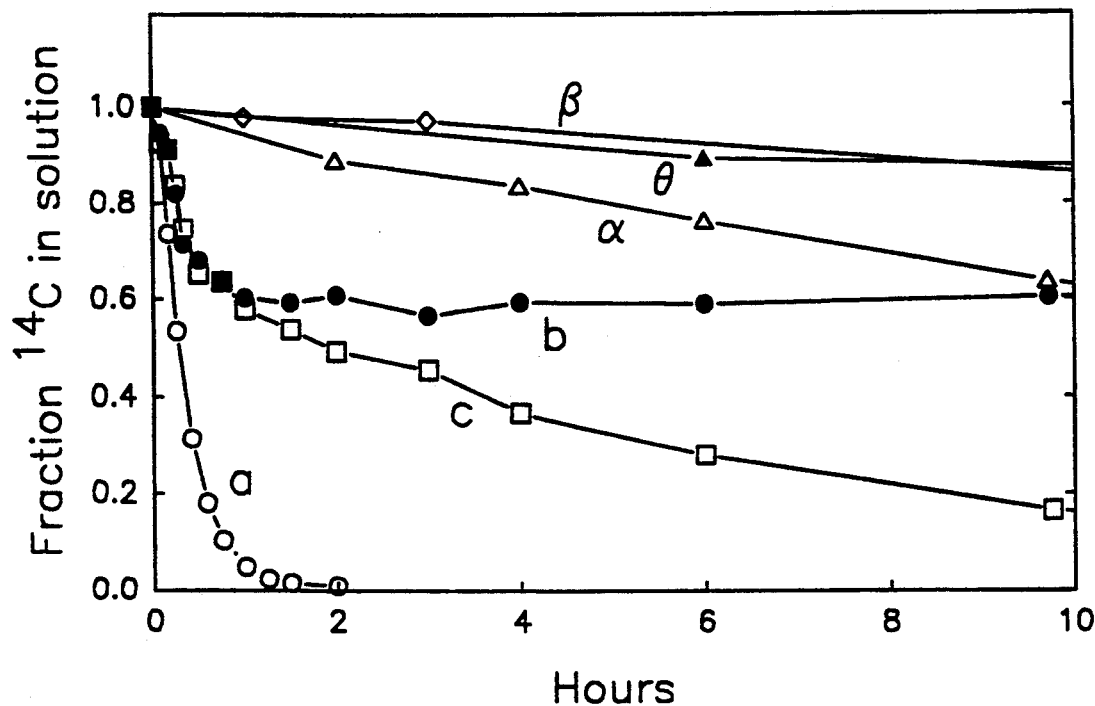

The results, plotted in FIGS. 10 and 11, are similar to 2,4-D (Example 1 above). The 2,4,5-T transformation at pH 2.8 is somewhat slower than 2,4-D, both in the dark and in the light. Chlorine is released rapidly and quantitatively (FIG. 10); chlorine in the species 2,4,5-T, trichlorophenol (TCP), and $Cl^-$ together accounted for between 93 and 115% of total chlorine throughout the reaction period.

Using initial rates, transformation of 2,4,5-T under bright light is 1.6 times faster than in the dark. Samples, of 2,4,5-T were irradiated also under "dim" light (FIG. 11), which was 17 to 18 times lower in intensity than the bright light (and comparable to a poorly lit room). Dim light has almost no effect on 2,4,5-T transformation compared to the dark reaction. Dim light also has no effect on ring mineralization of 2,4,5-T during the first hour. However, whereas mineralization in the dark reaction is over in about two hours, mineralization under dim light continues for at least 10 hours at a slow rate. Dim light reactions at high iron concentrations (>5 mM), in which red polymeric iron products were present, reach a plateau in mineralization after about 2 hours similar to the dark reactions.

Example 3

This example describes the degradation of the herbicide 2,4-dichlorophenoxyacetic acid (2,4-D) using ferrous ion and hydrogen peroxide using the method outlined in Example 1 above, except that $FeSO_4$ was used instead of $Fe(ClO_4)_3$.

Figure 13:
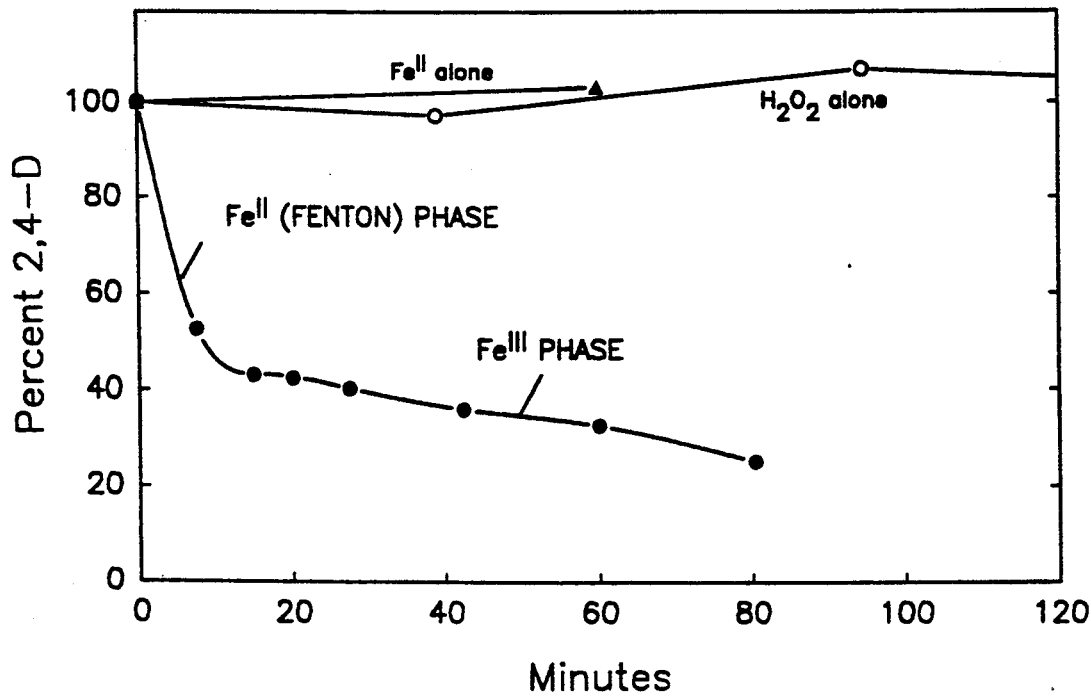
FIG. 13 shows the reaction of 2,4-dichlorophenoxyacetic acid with hydrogen peroxide and ferrous ion at pH 1.8 as described in Example 3. The reaction is 0.1 mM in herbicide, 0.99 mM in ferrous sulfate, and 0.96 mM in peroxide.

The reaction of 0.1 mM herbicide with $Fe^{+2}$ and an excess of hydrogen peroxide in an air-saturated acidic solution at 21° C. is plotted in FIG. 13 (—•—). At higher concentrations of ferrous ion and hydrogen peroxide, i.e., greater than about 1 mM, 0.1 mM herbicide disappears in about a minute. No loss of herbicide is observed in controls carried out with hydrogen peroxide alone or with ferrous ion alone.

Figure 14:
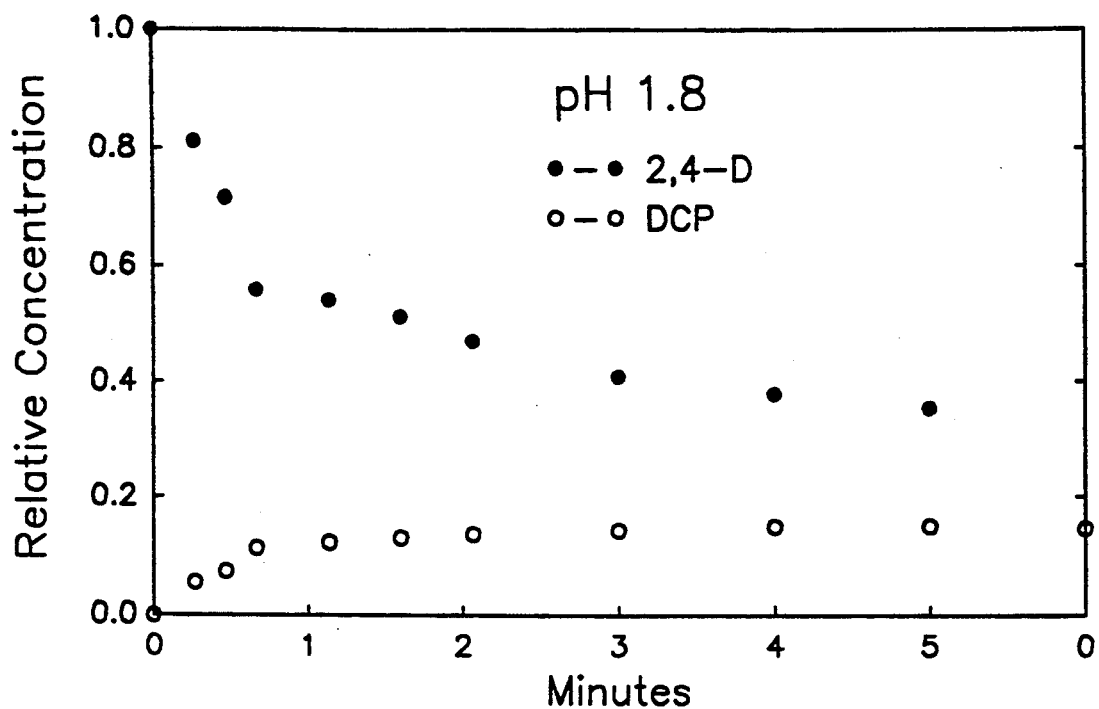
FIG. 14 shows the Fenton oxidation of 2,4-dichlorophenoxyacetic acid at different pHs (adjusted with sulfuric acid) as described in Example 3. The reactions are 0.1M in herbicide, 0.246M in ferrous ion, and 0.126 mM in peroxide. DCP is 2,4-dichlorophenol.
Figure 14A:
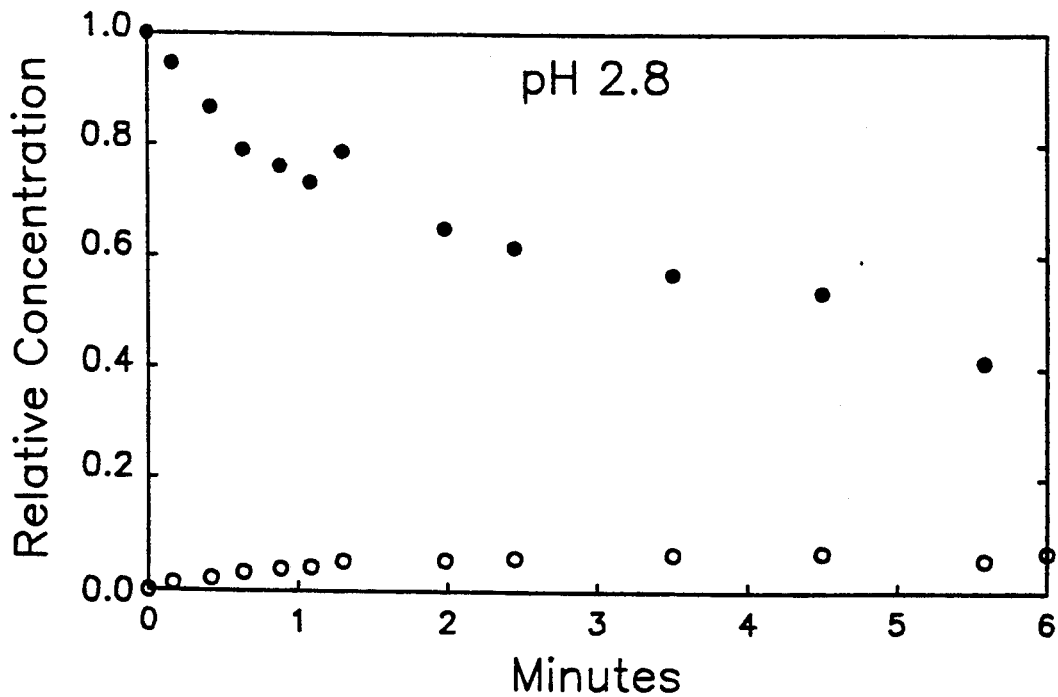
Figure 14B:
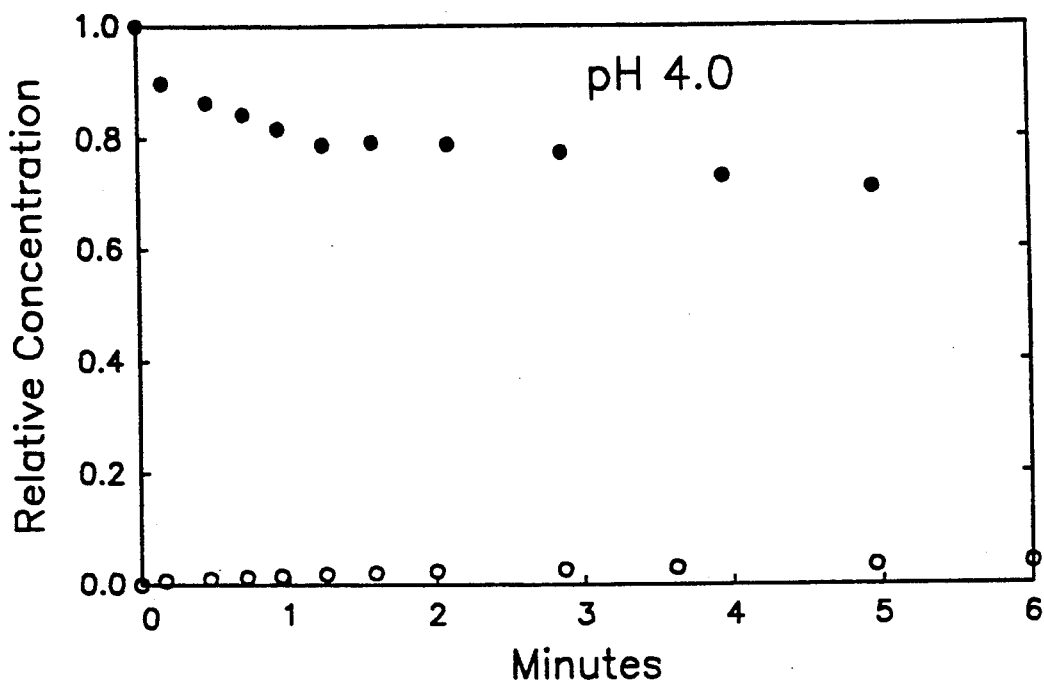

The Fenton's transformation of 2,4-D under conditions in which the $Fe^{+2}$ and $H_2O_2$ were initially present in a stoichiometric ratio of 2:1 is plotted as a function of pH in FIG. 14. The reaction rate decreases as the pH drops from 4.0 to 1.8. Dichlorophenol (DCP) is produced in low yield.

Figure 15:
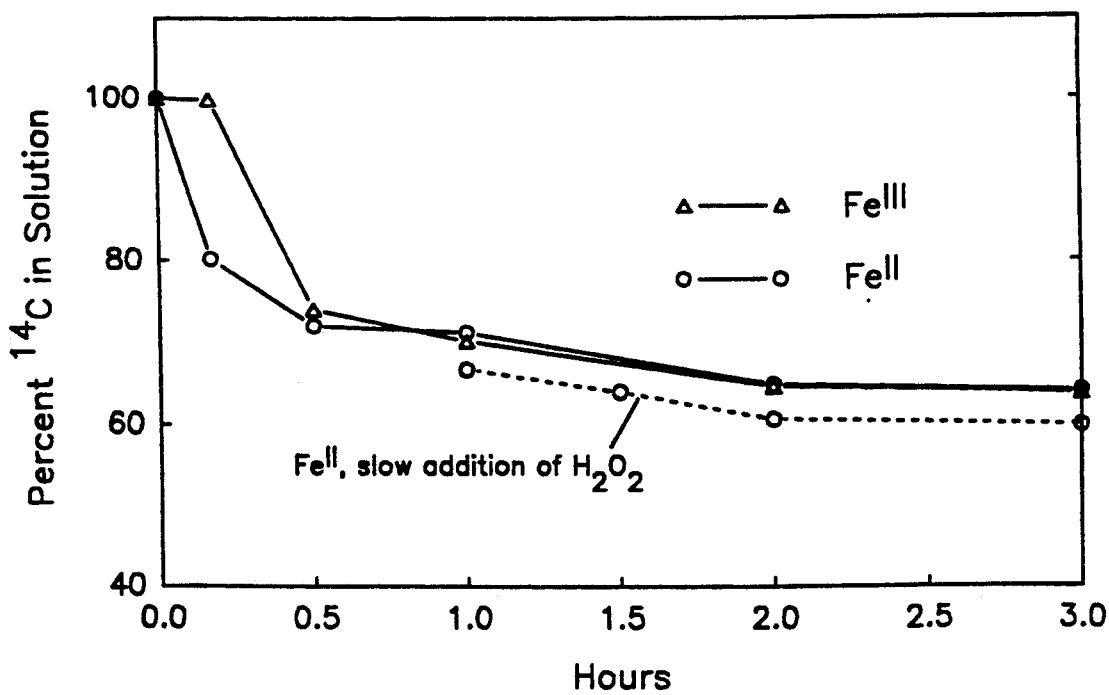
FIG. 15 shows a comparison the ferric reagent of this invention ($Fe^{+3}/H_2O_2$) with $Fe^{+2}/H_2O_2$ under optimal conditions employed for ferric reagent in the mineralization of ring-labelled 2,4-dichlorophenoxyacetic acid at a pH of 2.7 as described in Example 3. The reactions are 0.1 mM $1 \times 10^4$ DPM/ml in labelled herbicide, 1.0 mM in iron (perchlorate salts), 10 mM in peroxide and 0.2M in sodium perchlorate.

Mineralization of ring-$^{14}$C-2,4-D by Fenton's reagent ($Fe^{+2}/H_2O_2$) and $Fe^{+3}/H_2O_2$ ferric reagent is directly compared in the plot of FIG. 15. Substituting $Fe^{+2}$ in place of $Fe^{+3}$ had no substantial effect on the extent of mineralization of ring-$^{14}$-C-2,4-D, except during the first few minutes. These results indicate that the $Fe^{+3}/H_2O_2$ reaction is the primary cause of mineralization under the pH and other conditions that optimize the activity of the ferric reagent of this invention.

Example 4

This example illustrates the degradation of atrazine using the ferric reagent of this invention.

Atrazine was purchased from Ciba-Geigy (99% pure). Ring-UL-$^{14}$C-atrazine (4.5 mCi/mmol, >98% pure) was purchased from Sigma Chemical Company. The procedures and reagents used for atrazine degradation are those described under Example 1 above, except that the mobile phase for HPLC analysis of atrazine is 65/35 (v/v) methanol-water at 1 ml per minute.

Figure 16:
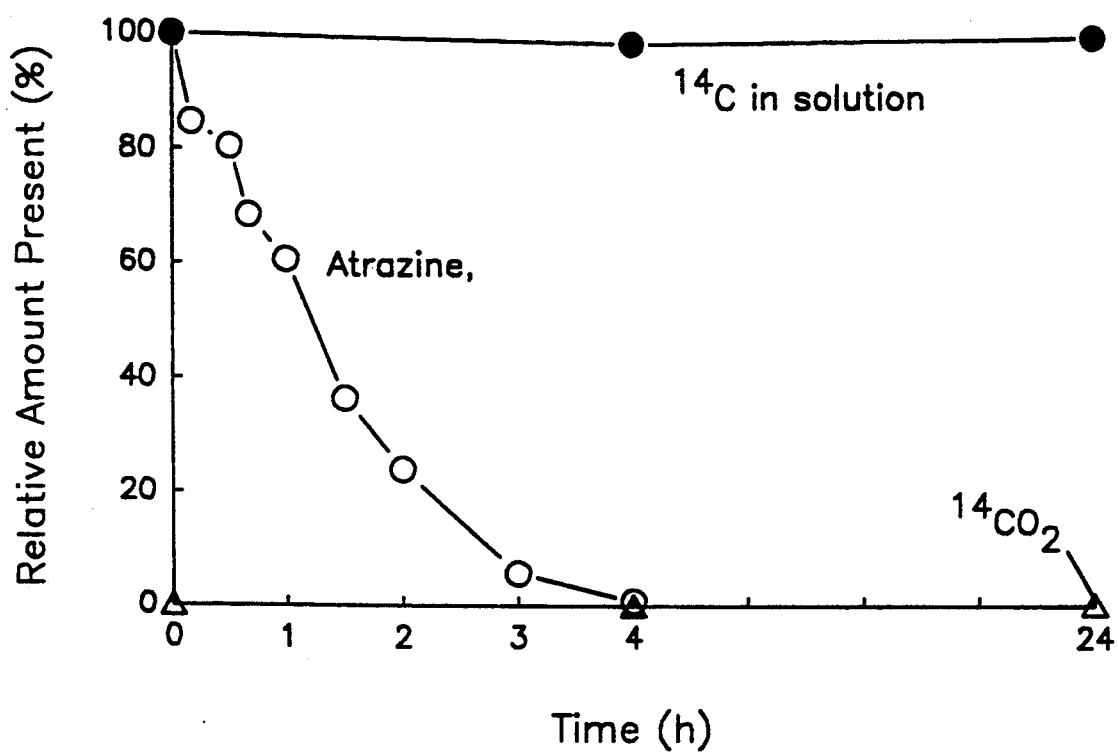
FIG. 16 shows the degradation of ring-UL-$^{14}$C-atrazine in the dark with 1 mM ferric perchlorate, 10 mM hydrogen peroxide at pH 2.75, and 0.2M sodium perchlorate.

FIG. 16 shows the degradation of 0.1 mM ring-UL-$^{14}$C-atrazine in the presence of 1 mM ferric ion and 10 mM hydrogen peroxide at pH 2.75 in the dark. Atrazine disappears from solution in about 4 hours. However, no $^{14}CO_2$ is released, and $^{14}C$ in solution remains at initial levels. This suggests that the s-triazine ring remained intact.

The above description is for the purpose of teaching the person of ordinary skill in the art how to practice the present invention, and it is not intended to detail all those obvious modifications and variations of it which will become apparent to the skilled worker upon reading the description. It is intended, however, that all such obvious modifications and variations be included within the scope of the present invention, which is defined by the following claims.

What is claimed is:

1. A method for degrading an organic pesticide containing oxidizable aliphatic or aromatic functional groups comprising contacting said pesticide, in an acidic aqueous solution in the presence of light, with ferric ion and a peroxide in amounts effective to achieve substantial mineralization of said pesticide.

2. A method according to claim 1 wherein said solution has a pH of about 1.5 to about 3.5.

3. A method according to claim 1 wherein said peroxide is hydrogen peroxide.

4. A method according to claim 3 wherein said organic pesticide is selected from the group consisting of 2,4-dichlorophenoxyacetic acid, 2,4,5-trichlorophenoxyacetic acid, atrazine and 2-chloro-N-(2-ethyl-6-methylphenyl)-N-(2-methoxy-1-methylethyl)acetamide.

5. A method according to claim 1 wherein said light has an intensity of at least about 1.2 $mW/cm^2$ in the visible region.

6. A method for degrading an organic pesticide containing oxidizable aliphatic or aromatic functional groups comprising contacting said pesticide, in an aqueous solution having a pH of about 2.5 to about 3.0 in the presence of light, with ferric ion and peroxide in amounts effective to achieve substantial mineralization of said pesticide for a time effective to achieve substantial mineralization of said pesticide.

7. A method according to claim 6 wherein said pesticide is an aromatic compound.

8. A method according to claim 6 wherein said pesticide is selected from the group consisting of 2,4-dichlorophenoxyacetic acid, 2,4,5-trichlorophenoxyacetic acid and atrazine.

9. A method according to claim 6 comprising an initial ferric ion concentration of about 0.2 mM to about 2.5 mM and an initial peroxide concentration of about 1.0 mM to about 500 mM.

10. A method according to claim 6 wherein said peroxide is hydrogen peroxide.

11. A method for substantially mineralizing an organic aromatic pesticide comprising contacting up to about 1.0 mM of said pesticide, in an aqueous solution having a pH of about 1.5 to about 3.5, with about 0.2 mM to about 2.5 mM ferric ion and about 1 mM to about 500 mM hydrogen peroxide in the presence of light and in the absence of large concentrations of organic solvents, chloride, and sulfate.

12. A method according to claim 11 wherein said ferric ion is derived from ferric perchlorate or ferric nitrate.

13. A method according to claim 11 wherein said organic aromatic pesticide is selected from the group consisting of 2,4-dichlorophenoxyacetic acid, 2,4,5-trichlorophenoxyacetic acid, 2-chloro-N-(2-ethyl-6-methylphenyl)-N-(2-methoxy-1-methylethyl)acetamide and atrazine.

* * * * *